United States Patent
Tokairin et al.

(10) Patent No.: US 9,374,147 B2
(45) Date of Patent: Jun. 21, 2016

(54) BASE STATION AND METHOD OF CALCULATING CORRECTION VALUE

(71) Applicant: KYOCERA Corporation, Kyoto-shi, Kyoto (JP)

(72) Inventors: Takeshi Tokairin, Yokohama (JP); Masashi Iwami, Ogaki (JP)

(73) Assignee: KYOCERA Corporation, Kyoto (JP)

( * ) Notice: Subject to any disclaimer, the term of this patent is extended or adjusted under 35 U.S.C. 154(b) by 135 days.

(21) Appl. No.: 14/347,554

(22) PCT Filed: Sep. 27, 2012

(86) PCT No.: PCT/JP2012/074827
§ 371 (c)(1),
(2) Date: Mar. 26, 2014

(87) PCT Pub. No.: WO2013/047635
PCT Pub. Date: Apr. 4, 2013

(65) Prior Publication Data
US 2014/0233522 A1    Aug. 21, 2014

(30) Foreign Application Priority Data

Sep. 28, 2011   (JP) .................. 2011-212420

(51) Int. Cl.
*H04B 7/06* (2006.01)
*H04B 1/10* (2006.01)
(Continued)

(52) U.S. Cl.
CPC ............ *H04B 7/0632* (2013.01); *H04B 1/1027* (2013.01); *H04B 7/0413* (2013.01);
(Continued)

(58) Field of Classification Search
CPC .. H04W 24/02; H04W 72/085; H04B 7/0413; H04L 1/0003; H04L 1/0009; H04L 1/0026; H04L 1/06; H04L 5/0058
See application file for complete search history.

(56) References Cited

U.S. PATENT DOCUMENTS 7,359,327 B2   4/2008 Oshiba
7,444,169 B2   10/2008 Ishii et al.
(Continued)

FOREIGN PATENT DOCUMENTS

| | | |
|---|---|---|
| JP | 2004-297232 A | 10/2004 |
| JP | 2005-86304 A | 3/2005 |

(Continued)

OTHER PUBLICATIONS

International Preliminary Report on Patentability and Written Opinion of the International Searching Authority issued by the International Bureau for International Application No. PCT/JP2012/074827.
International Search Report for PCT/JP2012/074827 dated Dec. 18, 2012.

*Primary Examiner* — Kwang B Yao
*Assistant Examiner* — Moo Ryong Jeong
(74) *Attorney, Agent, or Firm* — Procopio, Cory, Hargreaves & Savitch LLP

(57) ABSTRACT

In a base station, a downlink radio resource and an uplink radio resource to be used for transmission of a known signal from a communication terminal are associated for null steering to be performed based on the known signal. A correction value calculating unit calculates a first correction value used to correct a downlink quality value obtained by a communication terminal. The correction value calculating unit calculates a second correction value used to correct a downlink quality value obtained by a communication terminal.

5 Claims, 17 Drawing Sheets

(51) Int. Cl.
  *H04W 72/08*  (2009.01)
  *H04W 72/04*  (2009.01)
  *H04B 7/04*  (2006.01)
  *H04L 1/00*  (2006.01)
  *H04L 1/06*  (2006.01)
  *H04L 5/00*  (2006.01)
  *H04W 24/02*  (2009.01)

(52) U.S. Cl.
  CPC .............. *H04B 7/0417* (2013.01); *H04B 7/061* (2013.01); *H04B 7/0619* (2013.01); *H04L 1/0003* (2013.01); *H04L 1/0009* (2013.01); *H04L 1/0026* (2013.01); *H04L 1/06* (2013.01); *H04L 5/0058* (2013.01); *H04W 24/02* (2013.01); *H04W 72/04* (2013.01); *H04W 72/08* (2013.01); *H04W 72/085* (2013.01)

(56) References Cited

U.S. PATENT DOCUMENTS

| | | | |
|---|---|---|---|
| 7,583,968 | B2 | 9/2009 | Kimura |
| 7,751,368 | B2 | 7/2010 | Li et al. |
| 7,937,111 | B2 | 5/2011 | Ishii et al. |
| 2011/0305152 | A1 | 12/2011 | Ofuji et al. |
| 2013/0039319 | A1* | 2/2013 | Shi ................... H04L 5/0023 370/329 |
| 2013/0235835 | A1* | 9/2013 | Wang ................ H04B 7/0417 370/329 |

FOREIGN PATENT DOCUMENTS

| | | |
|---|---|---|
| JP | 2005-318470 A | 11/2005 |
| JP | 2009-536003 A | 10/2009 |
| JP | 2010-154108 A | 7/2010 |

\* cited by examiner

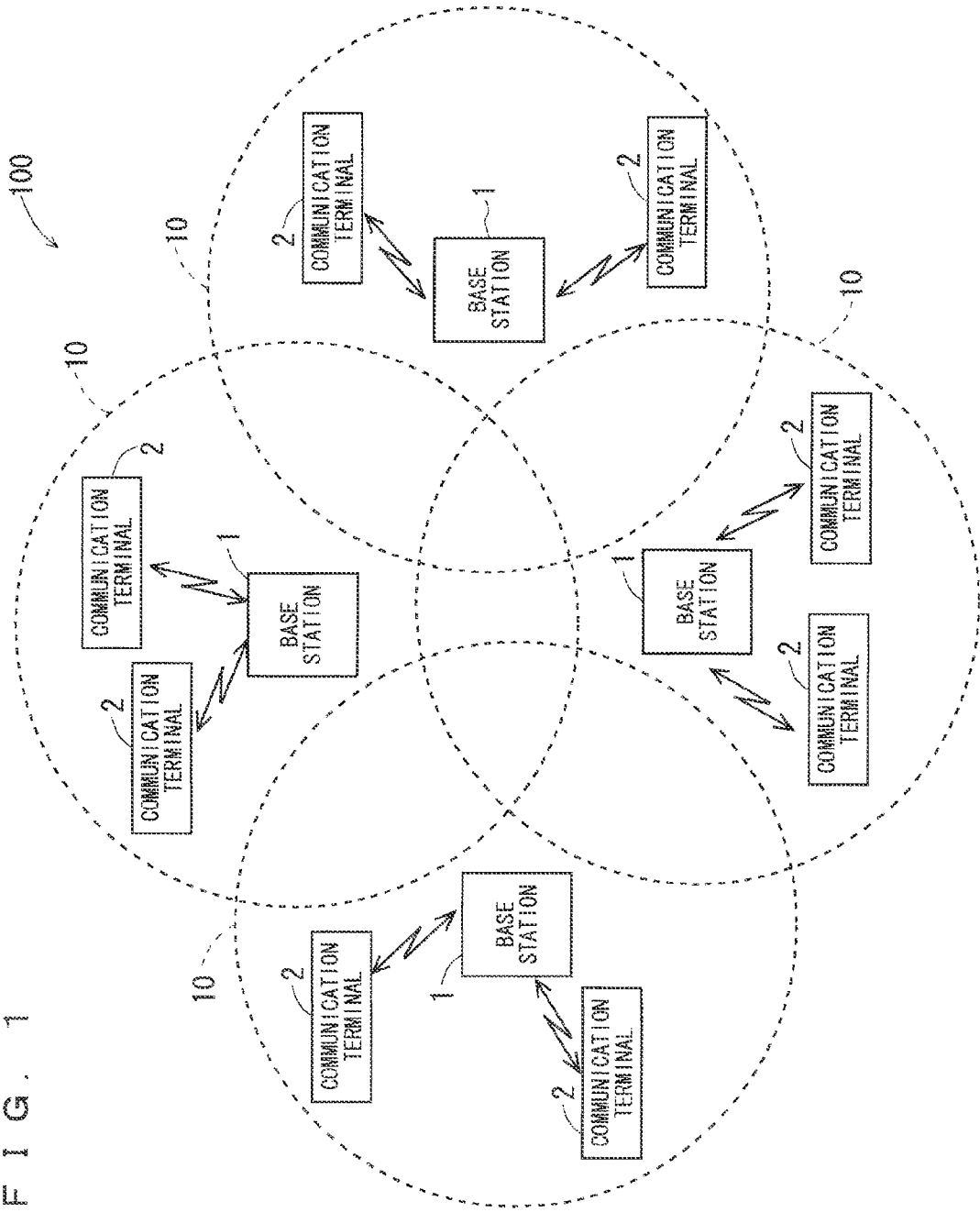
F I G. 1

F I G. 1 4
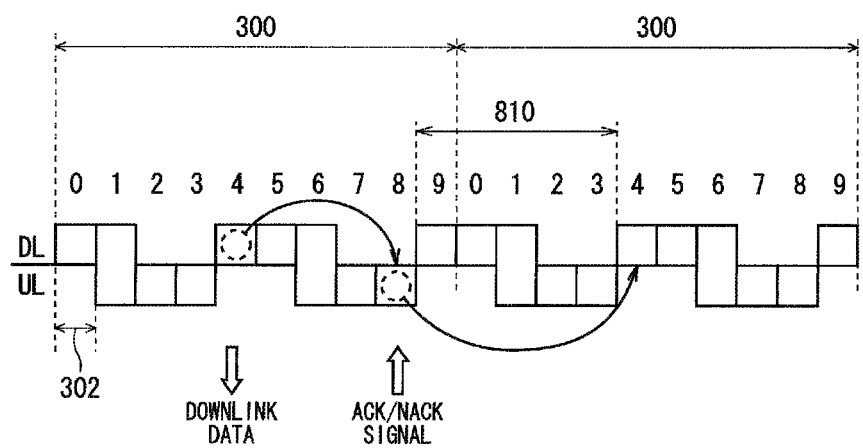

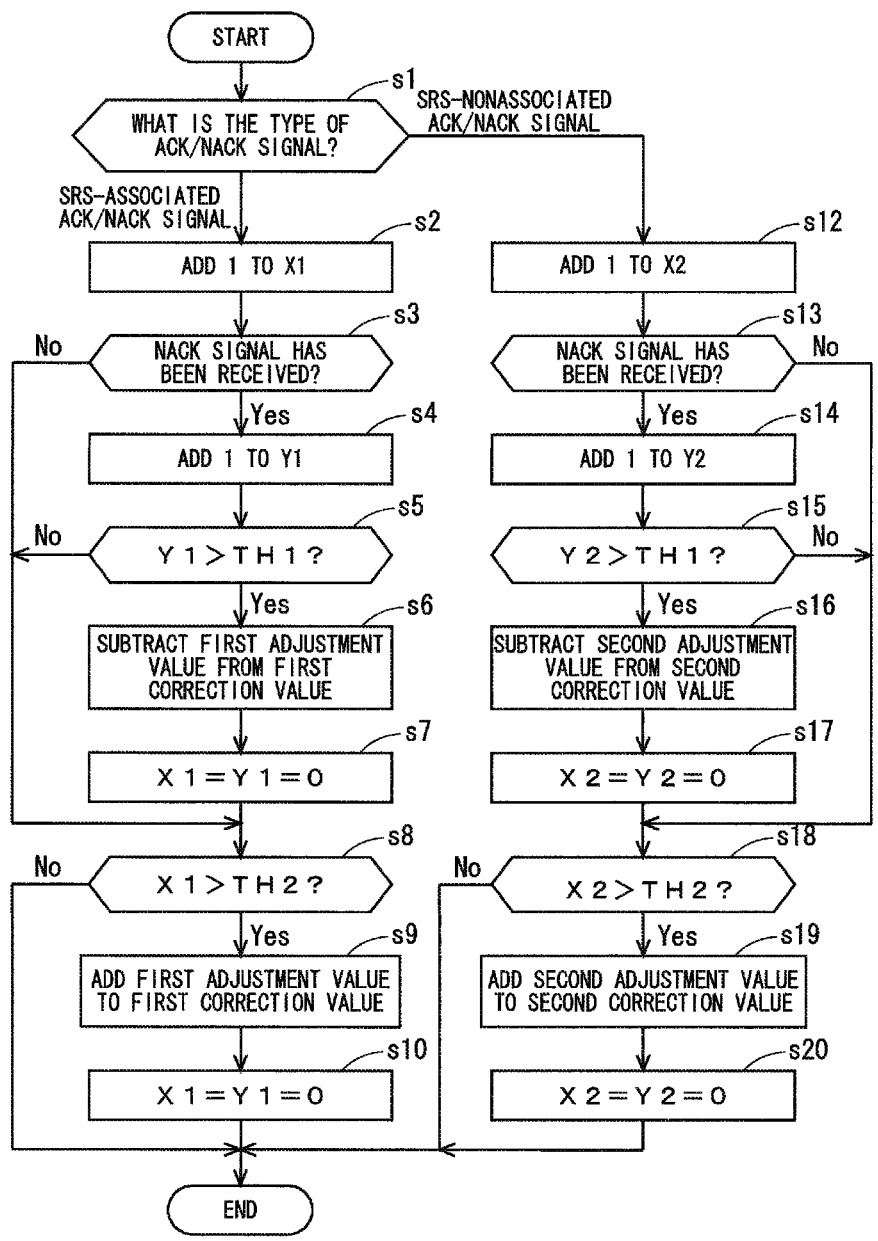

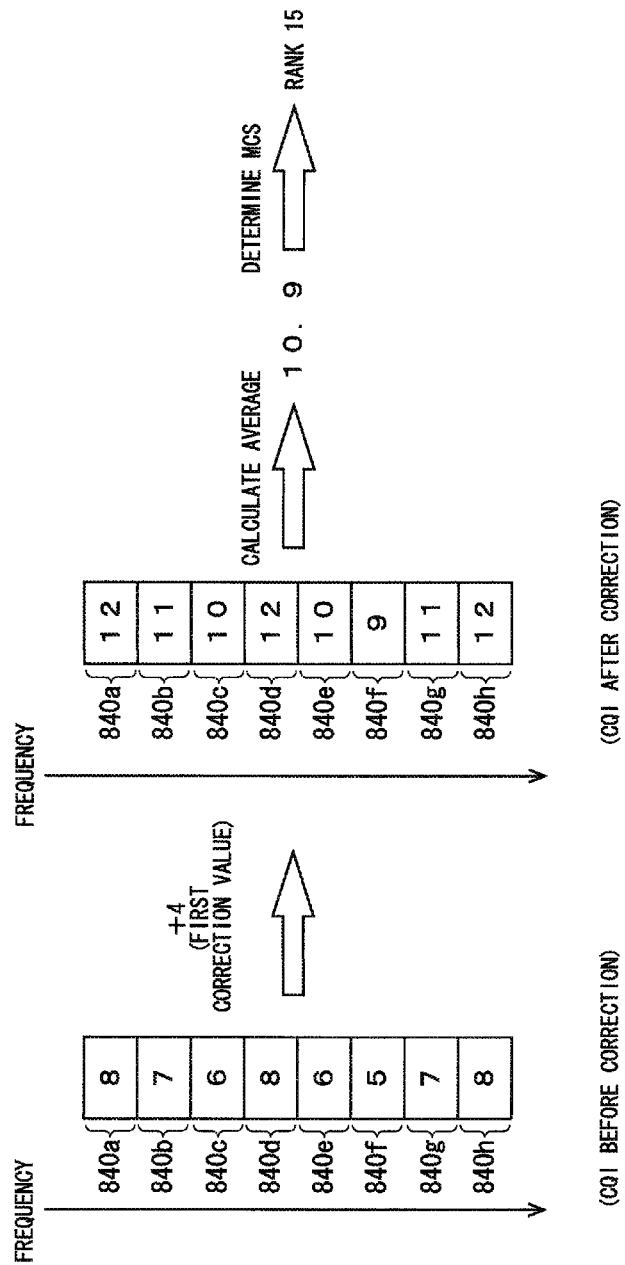

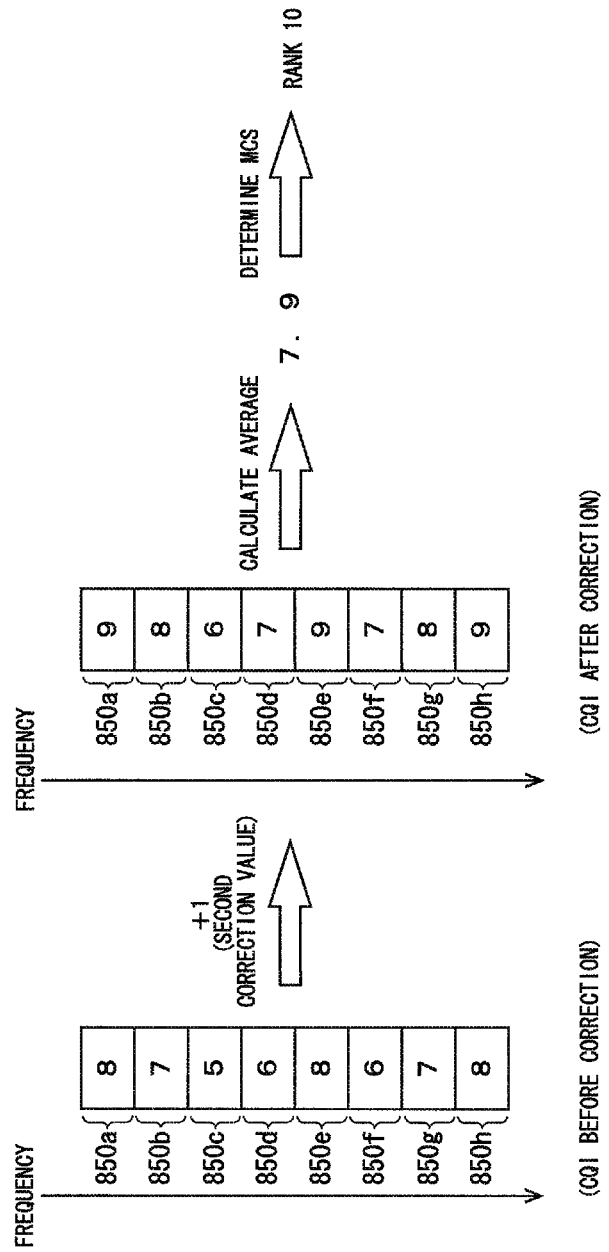

BASE STATION AND METHOD OF CALCULATING CORRECTION VALUE

TECHNICAL FIELD

The present invention relates to a base station that controls the transmission directivity of a plurality of antennas.

BACKGROUND ART

Various techniques relating to radio communication have been suggested conventionally. According to a technique disclosed in patent literature 1, for example, a plurality of radio communication devices makes radio communication using an MIMO (multiple input multiple output) scheme.

PRIOR ART LITERATURE

Patent Literature

Patent Literature 1: Japanese Unexamined Patent Application Publication (Translation of PCT Application) No. 2009-536003

SUMMARY OF INVENTION

Problem to be Solved by the Invention

In a radio communication system with a base station and a communication terminal, the communication terminal obtains a downlink communication quality based on a signal from the base station, and feeds the quality back to the base station. Based on the downlink communication quality acquired from the communication terminal, the base station makes scheduling of a downlink radio resource, or the like. If the downlink communication quality acquired by the base station is not sufficiently accurate, the performance of the base station might be degraded. Hence, enhancing the accuracy of this downlink communication quality has been desired.

The present invention has been made in view of the aforementioned issues, and is intended to provide a technique capable of enhancing the accuracy of a downlink communication quality acquired by a base station.

Means to Solve the Problems

A base station according to one aspect includes: a communication unit that makes communication using a plurality of antennas, the communication unit controlling the transmission directivity of the antennas based on a known signal transmitted from a communication terminal, when performing for downlink communication; and a correction value calculating unit that obtains a correction value used to correct a downlink quality value indicating a downlink communication quality which a communication terminal obtains based on a signal transmitted from the communication unit. A downlink radio resource and an uplink radio resource to be used for transmission of the known signal from a communication terminal are associated for null steering to be performed based on the known signal. The correction value calculating unit calculates a first correction value used to correct the downlink quality value obtained by a communication terminal. The first correction value is calculated based on a response signal indicating whether the communication terminal has properly received a signal which the communication unit transmits to this communication terminal using an associated downlink radio resource associated with an uplink radio resource used by this communication terminal for transmission of the known signal. The correction value calculating unit calculates a second correction value used to correct the downlink quality value obtained by a communication terminal. The second correction value is calculated based on a response signal indicating whether the communication terminal has properly received a signal which the communication unit transmits to this communication terminal using a nonassociated downlink radio resource not associated with an uplink radio resource used by this communication terminal for transmission of the known signal.

A method of calculating a correction value according to one aspect is a method of calculating a correction value used to correct a downlink quality value indicating a downlink communication quality. The method is implemented in a base station that makes communication using a plurality of antennas. The base station controls the transmission directivity of the antennas based on a known signal transmitted from a communication terminal, when performing downlink communication. In the base station, a downlink radio resource and an uplink radio resource to be used for transmission of the known signal from a communication terminal are associated for null steering to be performed based on the known signal. The method includes: (a) a step of calculating a first correction value used to correct a downlink quality value indicating a downlink communication quality which a communication terminal obtains based on a signal transmitted from the base station, the first correction value being calculated based on a response signal indicating whether the communication terminal has properly received a signal which the base station transmits to this communication terminal using an associated downlink radio resource associated with an uplink radio resource used by this communication terminal for transmission of the known signal; and (b) a step of calculating a second correction value used to correct the downlink quality value obtained by a communication terminal, the second correction value being calculated based on a response signal indicating whether the communication terminal has properly received a signal which the base station transmits to this communication terminal using a nonassociated downlink radio resource not associated with an uplink radio resource used by this communication terminal for transmission of the known signal.

Advantageous Effects of the Invention

The present invention is capable of enhancing the accuracy of a downlink communication quality acquired by a base station.

These and other objects, features, aspects, and advantages of the present invention will become more apparent from the following detailed description and the accompanying drawings.

BRIEF DESCRIPTION OF DRAWINGS

FIG. 1 shows the configuration of a radio communication system.

FIG. 14 shows action by the radio communication system.

FIG. 15 is a flowchart showing action by a correction value calculating unit.

FIG. 16 shows a method implemented by an MCS determining unit to determine an MCS.

FIG. 17 shows a method implemented by the MCS determining unit to determine an MCS.

DESCRIPTION OF EMBODIMENT(S)

Figure 2:
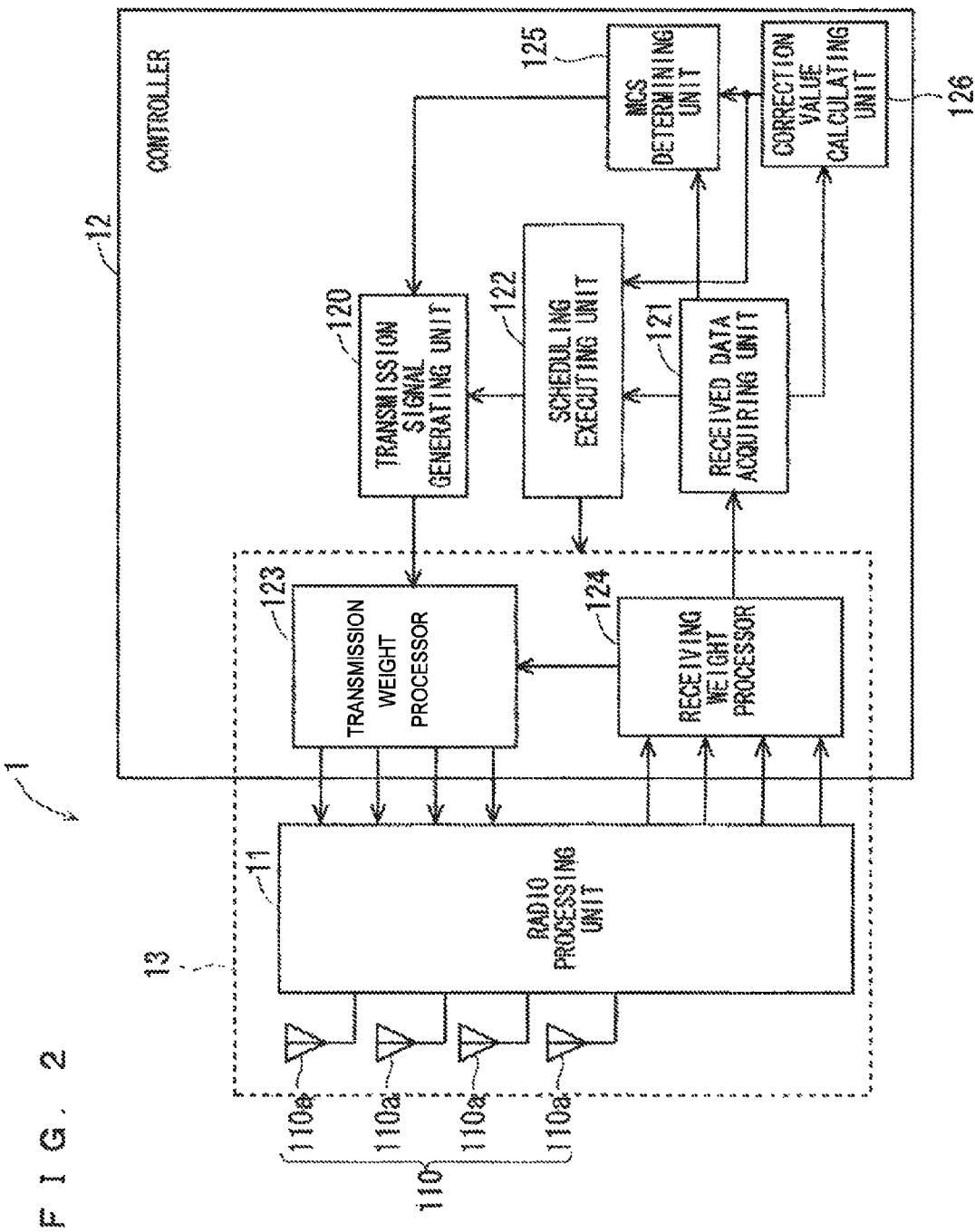
FIG. 2 shows the configuration of a base station according to an embodiment of the present invention.

FIG. 1 shows the configuration of a radio communication system 100 including a base station 1 according to an embodiment of the present invention. The radio communication system 100 is LTE (Long Term Evolution) that adopts a TDD (time division duplexing) system as a duplex operation system. Long Term Evolution is also called "E-UTRA."

The radio communication system 100 includes a plurality of base stations 1. Each base station 1 makes communication with a plurality of communication terminals 2. Long Term Evolution adopts an OFDMA (orthogonal frequency division multiple access) system for downlink communication, and an SC-FDMA (single carrier-frequency division multiple access) system for uplink communication. An OFDM (orthogonal frequency division multiplexing) signal synthesized from a plurality of subcarriers orthogonal to each other is used for communication between the base station 1 and the communication terminal 2.

As shown in FIG. 1, a service area 10 of each base station 1 partially overlaps a service area 10 of a peripheral base station 1. Only four base stations 1 are shown in FIG. 1, so that one base station 1 corresponds to only two or three peripheral base stations 1. However, in a practical sense, one base station 1 may correspond for example to six peripheral base stations 1.

The base stations 1 are connected to a network not shown in the drawings, and can communication with each other via this network. A server not shown in the drawings is connected to the network. Each base station 1 can communicate with the server via the network.

FIG. 2 shows the configuration of each base station 1 according to the embodiment of the present invention. The base station 1 allocates to each of the communication terminals 2 a radio resource specified in two dimensions by a time axis and a frequency axis, thereby allowing the base station 1 to make communication with these communication terminals 2 simultaneously. The base station 1 includes an array antenna as a transmitting and receiving antenna. The base station 1 can control the directivity of the array antenna by using an adaptive array antenna system.

As shown in FIG. 2, the base station 1 includes a radio processing unit 11 and a controller 12 that controls the radio processing unit 11. The radio processing unit 11 includes an array antenna 110 composed of a plurality of antennas 110a. The radio processing unit 11 performs amplification process, down-conversion, A/D conversion process and the like on each of a plurality of received signals received by the array antenna 110 to generate a plurality of baseband received signals, and outputs these received signals.

Further, the radio processing unit 11 performs D/A conversion process, up-conversion, amplification process and the like on each of a plurality of baseband transmission signals generated by the controller 12 to generate a plurality of transmission signals in a carrier frequency band. Then, the radio processing unit 11 inputs the resultant transmission signals in the carrier frequency band to each of the antennas 110a forming the array antenna 110. As a result, a transmission signal is transmitted without wires from each antenna 110a.

The controller 12 is composed of a CPU (central processing unit), a DSP (digital signal processor), a memory, and the like. In the controller 12, the CPU and the DSP execute various programs in the memory, thereby forming a plurality of functional blocks including a transmission signal generating unit 120, a received data acquiring unit 121, a scheduling executing unit 122, a transmission weight processor 123, a reception weight processor 124, an MCS determining unit 125, and a correction value calculating unit 126 or the like.

The MCS determining unit 125 determines an MCS (modulation and coding scheme) to be applied to a transmission signal to be transmitted from the base station 1 to the communication terminal 2. The MCS indicates a combination of a modulation system such as QPSK (quadrature phase shift keying) or 16QAM (quadrature amplitude modulation) and the code rate of an error correction code. The MCS determining unit 125 determines an MCS to be applied to a transmission signal to be transmitted to the communication terminal 2 based on the quality of downlink communication between the base station 1 and this communication terminal 2 to be made in the frequency band of this transmission signal.

The transmission signal generating unit 120 generates transmission data to be transmitted to the communication terminal 2 as a communication counterpart. The transmission data contains control data and user data. Further, the transmission signal generating unit 120 generates a baseband transmission signal containing the resultant transmission data based on an MCS determined by the MCS determining unit 125. The number of such transmission signals to be generated corresponds to the number of the antennas 110a forming the array antenna 110.

The transmission weight processor 123 determines a plurality of transmission weights for corresponding ones of transmission signals generated by the transmission signal generating unit 120. These transmission weights are intended to control the transmission directivity of the array antenna 110. Further, the transmission weight processor 123 performs IDFT (inverse discrete Fourier transform) and the like on the transmission signals for which the respective transmission weights are determined, and then outputs the resultant transmission signals to the radio processing unit 11.

The reception weight processor 124 performs DFT (discrete Fourier transform) on a plurality of received signals input from the radio processing unit 11, and then determines a plurality of reception weights for corresponding ones of these received signals. These reception weights are intended to control a reception directivity of the array antenna 110. Further, the reception weight processor 124 combines the received signals for which the respective reception weights are determined to generate a new received signal (hereinafter called a "synthesized received signal").

The received data acquiring unit 121 performs inverse discrete Fourier transform, demodulation process and the like on the synthesized received signal generated by the reception weight processor 124 to acquire control data and user data in this synthesized received signal.

In the base station 1 of this embodiment, the radio processing unit 11, the transmission weight processor 123, and the reception weight processor 124 form a communication unit 13 that makes communication with the communication terminals 2 while adaptively controlling the directivity of the array antenna 110. The communication unit 13 controls each of the reception directivity and the transmission directivity of the array antenna 110 while making communication with the communication terminal 2. More specifically, the communication unit 13 makes the reception weight processor 124 control a reception weight by which a received signal is to be multiplied, thereby allowing a beam and a null of the reception directivity of the array antenna 110 to point in various directions. Further, the communication unit 13 makes the transmission weight processor 123 control a transmission weight by which a transmission signal is to be multiplied, thereby allowing a beam and a null of the transmission directivity of the array antenna 110 to point in various directions. The transmission weight can be obtained from the reception weight. The reception weight can be obtained based on a known signal from the communication terminal 2.

The scheduling executing unit 122 determines the communication terminal 2 with which downlink communication of data is to be made, and makes downlink scheduling of allocating to this communication terminal 2 a downlink radio resource to be used for the downlink communication of the data with this communication terminal 2 (hereinafter called a "use downlink radio resource"). Based on the use downlink radio resource allocated to the communication terminal 2 by the scheduling executing unit 122, the transmission signal generating unit 120 generates a transmission signal containing data to be transmitted to this communication terminal 2 and inputs this transmission signal to the transmission weight processor 123 in compliance with timing determined based on this use downlink radio resource. As a result, the transmission signal containing the data to be transmitted to the communication terminal 2 is transmitted from the communication unit 13 using the use downlink radio resource allocated to this communication terminal 2. The transmission signal generating unit 120 generates a transmission signal containing control data to be used to notify the communication terminal 2 of the use downlink radio resource allocated to this communication terminal 2 by the scheduling executing unit 122, and outputs the resultant transmission signal. This allows the communication terminal 2 to know the use downlink radio resource to be used for transmission of data directed to the communication terminal 2 itself. Thus, the communication terminal 2 can receive the data properly from the base station 1 directed to the communication terminal 2 itself.

The scheduling executing unit 122 determines the communication terminal 2 to make uplink communication of data, and makes uplink scheduling of allocating to this communication terminal 2 an uplink radio resource to be used for the uplink communication of the data with this communication terminal 2 (hereinafter called an "use uplink radio resource"). The transmission signal generating unit 120 generates a transmission signal containing control data to be used to notify the communication terminal 2 of the use uplink radio resource allocated to this communication terminal 2 by the scheduling executing unit 122, and outputs the resultant transmission signal. This allows the communication terminal 2 to know the use uplink radio resource to be used for transmission of data to the base station 1. Then, the communication terminal 2 wirelessly transmits the data to the base station 1 using this use uplink radio resource announced from the base station 1.

Further, the scheduling executing unit 122 allocates to the communication terminal 2 an uplink radio resource to be used when this communication terminal 2 transmits a sounding reference signal (SRS) as a known signal described later (hereinafter called a "use uplink radio resource for SRS"). The transmission signal generating unit 120 generates a transmission signal containing control data to be used to notify the communication terminal 2 of the use uplink radio resource for SRS allocated to this communication terminal 2 by the scheduling executing unit 122, and outputs the resultant transmission signal. This allows the communication terminal 2 to know the use uplink radio resource for SRS to be used for transmission of an SRS to the base station 1. The communication terminal 2 wirelessly transmits the SRS to the base station 1 using the use uplink radio resource for SRS announced from the base station 1.

The correction value calculating unit 126 calculates a correction value transmitted from the communication terminal 2 and used to correct a downlink quality value indicating the quality of downlink communication between this communication terminal 2 and the base station 1. As described later, a downlink quality value (downlink communication quality) announced from the communication terminal 2 is not sufficiently accurate. Hence, the correction value calculating unit 126 calculates a correction value used to correct this downlink quality value. Each communication terminal 2 obtains the quality of downlink communication with the base station 1 based on a known signal transmitted from the base station 1. Then, each communication terminal 2 transmits to the base station 1a transmission signal containing a downlink quality value indicating the downlink communication quality thereby obtained, specifically a CQI (channel quality indicator). LTE defines 15 types of values of from "1" to "15" as CQI values. A larger CQI value means a better communication quality. In the base station 1, the correction value calculating unit 126 calculates a correction value used to correct a CQI announced from the communication terminal 2. The CQI corrected with the correction value calculated by the correction value calculating unit 126 is used by the MCS determining unit 126 to determine an MCS or by the scheduling executing unit 122 to make downlink scheduling. The action by the correction value calculating unit 126 is described in detail later.

<Configuration of TDD Frame>

A TDD frame 300 used between the base station 1 and the communication terminal 2 is described next. The TDD frame 300 is specified in two dimensions by a time axis and a frequency axis. The base station 1 determines a use uplink radio resource, a use downlink radio resource, and a use uplink radio resource for SRS from the TDD frame 300 to be allocated to each communication terminal 2.

Figure 3:
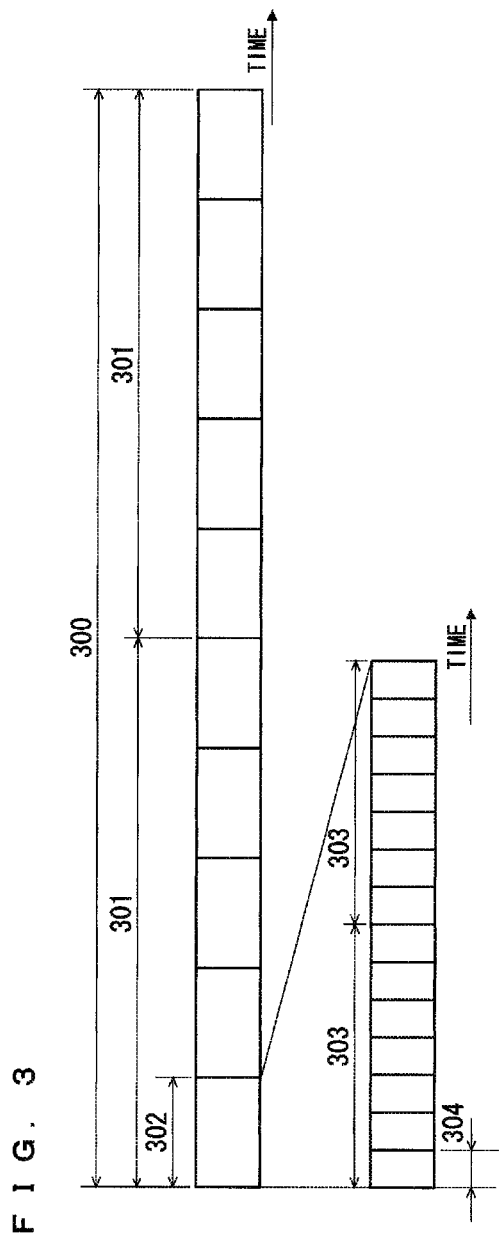
FIG. 3 shows the configuration of a TDD frame.

FIG. 3 shows the configuration of the TDD frame 300. As shown in FIG. 3, the TDD frame 300 is composed of two half-frames 301. Each half frame 301 is composed of five subframes 302. Specifically, the TDD frame 300 is composed of ten subframes 302. The subframe 302 has a time length of 1 ms. In the below, the ten subframes 302 forming the TDD frame 300 may be called zeroth to ninth subframes 302 in this order from the beginning of the TDD frame 300.

Each subframe 302 is composed of two slots 303 arranged in a temporal direction. Each slot 303 is composed of seven symbol periods 304. Thus, 14 symbol periods 304 arranged in the temporal direction are contained in both of the subframes 302. The symbol period 304 becomes one symbol period of an OFDM symbol for downlink communication of the OFDMA system and becomes one symbol period of a DFTS (discrete Fourier transform spread)-OFDM symbol for uplink communication of the SC-FDMA system.

The TDD frame 300 of the aforementioned configuration includes a subframe 302 dedicated to uplink communication and a subframe 302 dedicated to downlink communication. In the below, the subframe 302 dedicated to uplink communication will be called an "uplink subframe 302," and the subframe 302 dedicated to downlink communication will be called a "downlink subframe 302." The communication terminal 2 transmits data to the base station 1 in the uplink subframe 302, whereas the base station 1 transmits data to the communication terminal 2 in the downlink subframe 302.

According to LTE, in the TDD frame 300, a domain (radio resource) having a frequency bandwidth of 180 kHz in a frequency direction and including seven symbol periods 304 (one slot 303) in the temporal direction is called a "resource block (RB)." The resource block includes 12 subcarriers. Regarding allocation of a use downlink radio resource or allocation of a use uplink radio resource to the communication terminal 2, the scheduling executing unit 122 allocates to this communication terminal 2 a use uplink radio resource or a use downlink radio resource in units of two consecutive resource blocks, specifically in units of one subframe 302 in the temporal direction, and in units of one resource block in the frequency direction. In the below, for the convenience of description, "RB" means only the frequency bandwidth of a resource block and does not cover the original meaning of a resource block specified in the frequency and temporal directions.

According to LTE, seven types of configurations having different combinations of the uplink subframes 302 and the downlink subframes 302 are assumed as the configurations of the TDD frame 300. Long Term Evolution defines $0^{th}$ to $6^{th}$ configurations of the TDD frame 300.

Figure 4:
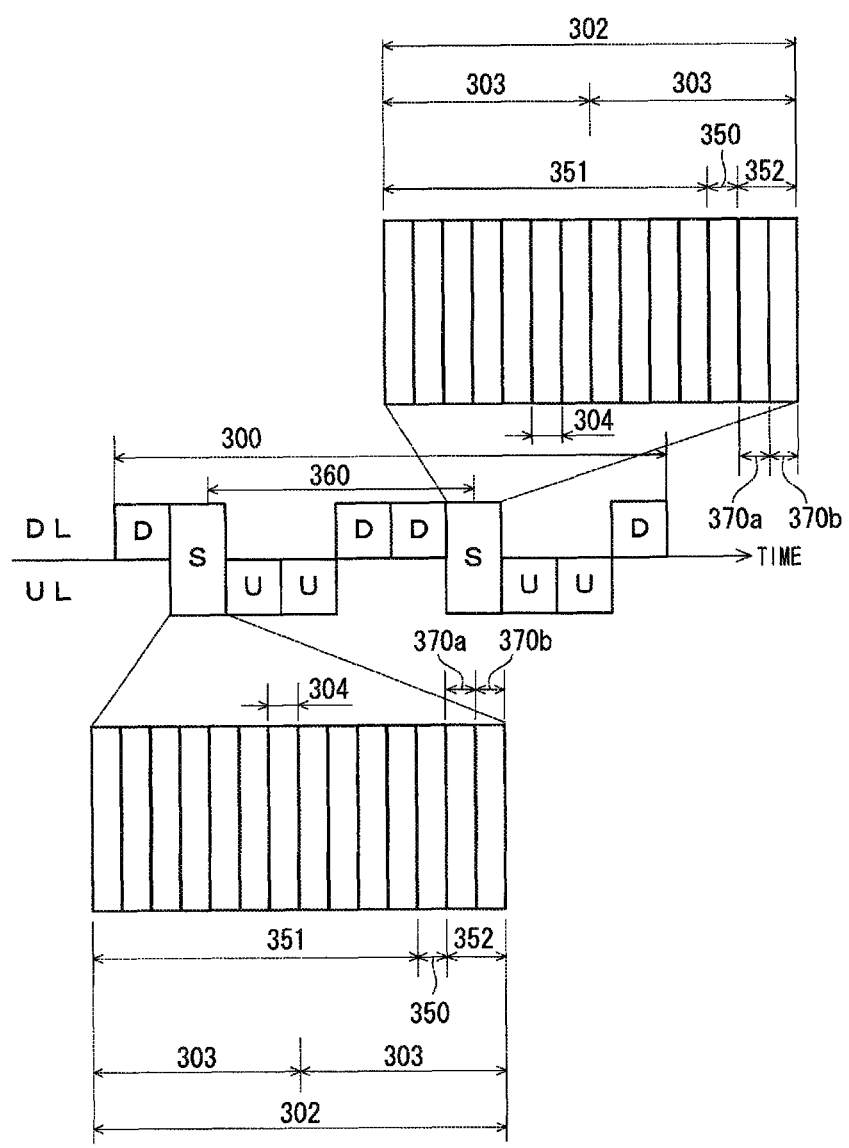
FIG. 4 shows the configuration of the TDD frame in detail.

FIG. 4 shows the configuration of the TDD frame 300 having the first configuration. In FIG. 4, the subframe 302 indicated by "D" means the downlink subframe 302, and the subframe 302 indicated by "U" means the uplink subframe 302. Further, the subframe 302 indicated by "S" means the subframe 302 where downlink communication is switched to uplink communication in the radio communication system 100. This subframe 302 is called a "special subframe 302."

As shown in FIG. 4, in the TDD frame 300 having the first configuration, zeroth, fourth, fifth, and ninth subframes 302 are the downlink subframes 302. Second, third, seventh, and eighth subframes 302 are the uplink subframes 302. First and sixth subframes 302 are the special subframes 302. The radio communication system 100 of this embodiment uses the TDD frame 300 having the first configuration, for example.

As shown in FIG. 4, the special subframe 302 includes a downlink pilot time slot (DwPTS) 351, guard time (GP) 350, and an uplink pilot time slot (UpPTS) 352 arranged in the temporal direction. The guard time 350 is a no-signal period required to switch downlink communication to uplink communication, and is not used for communication.

Long Term Evolution defines several types of combinations of the time lengths of the downlink pilot time slot 351, the guard time 350, and the uplink pilot time slot 352. In the example of FIG. 4, the time length of the downlink pilot time slot 351 is determined to be 11 symbol periods 304, and the time length of the uplink pilot time slot 352 is determined to be two symbol periods 304.

The radio communication system 100 of this embodiment can make downlink communication not only in the downlink subframe 302 but also in the downlink pilot time slot 351 of the special subframe 302. The radio communication system 100 can also make uplink communication not only in the uplink subframe 302 but also in the uplink pilot time slot 352 of the special subframe 302.

In this embodiment, the base station 1 transmits data to the communication terminal 2 in each symbol period 304 of the downlink pilot time slot 351. Each communication terminal 2 transmits a known signal called an SRS in one or both of the two symbol periods 304 of the uplink pilot time slot 352. The SRS is composed of a plurality of complex symbols to modulate a plurality of subcarriers. In this embodiment, an SRS transmitted in the uplink pilot time slot 352 is used to calculate a transmission weight. Specifically, the communication unit 13 of the base station 1 can control the transmission directivity of the array antenna 110 based on the SRS transmitted from the communication terminal 2 in the uplink pilot time slot 352. In the below, control of the transmission directivity of the array antenna 110 will be called "array transmission control."

An SRS can also be transmitted in the last symbol period 304 of the uplink subframe 302. Specifically, the communication terminal 2 can transmit data in each symbol period 304 of the uplink subframe 302 except the last symbol period 304 of this uplink subframe 302, and can transmit an SRS in the last symbol period 304. An SRS to be transmitted in the last symbol period 304 of the uplink subframe 302 can be used for the array transmission control. In the array transmission control of this embodiment, an SRS to be transmitted in the uplink pilot time slot 352 is used for the array transmission control.

In the below, unless otherwise specified, an SRS means an SRS to be transmitted using the uplink pilot time slot 352. A former symbol period 304 and a latter symbol period 340 of the uplink pilot time slot 352 where the communication terminal 2 can transmit an SRS are called a "first uplink communication period 370a for SRS" and a "second uplink communication period 370b for SRS" respectively. Where there is no particular reason to distinguish between the first and second uplink communication periods 370a and 370b for SRS, the first and second uplink communication periods 370a and 370b for SRS are each called an "uplink communication period for SRS."

A period from the beginning of the first uplink communication period 370a for SRS of the special subframe 302 to the beginning of the first uplink communication period 370a for SRS of the next special subframe 302 is called a "unit period 360." A radio resource such as a use downlink radio resource is allocated to the communication terminal 2 based on the unit period 360. The unit period 360 appears repeatedly in the radio communication system 100.

In this embodiment, each communication terminal 2 to make communication with the base station 1 is given a use uplink radio resource for SRS allocated by the scheduling executing unit 122, thereby transmitting an SRS at least once in each unit period 360. Specifically, in each unit period 360, each communication terminal 2 to make communication with the base station 1 transmits an SRS in one or both of the first and second uplink communication periods 370a and 370b for SRS of this unit period 360.

<Frequency Hopping of SRS Transmission Enabling Band>

Figure 5:
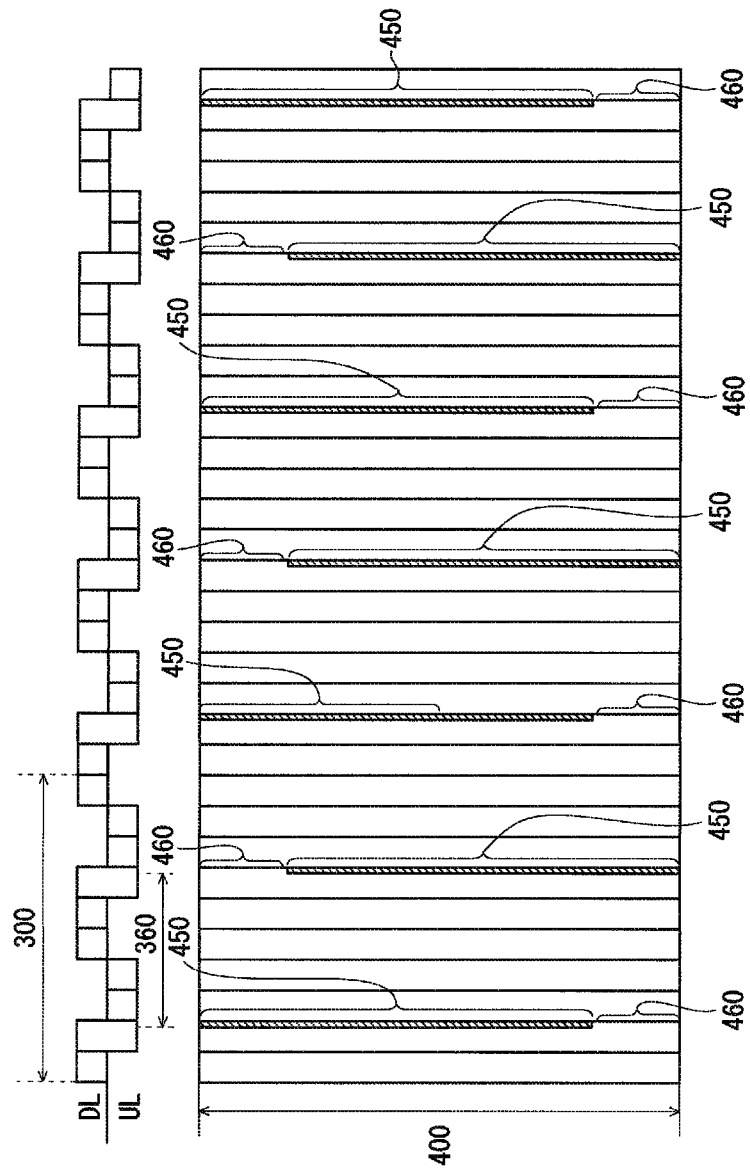
FIG. 5 shows frequency hopping of an SRS transmission enabling band.

In the radio communication system 100, a frequency band 450 that can be used for transmission of an SRS by the communication terminal 2 (hereinafter called an "SRS transmission enabling band 450") is subjected to frequency hopping in units of one unit period 360. FIG. 5 shows frequency hopping of the SRS transmission enabling band 450.

As shown in FIG. 5, the SRS transmission enabling band 450 in each unit period 360 is arranged on a high-frequency side and a low-frequency side of a system band 400 alternately. Thus, in each unit period 360, an end portion on the high-frequency side or an end portion on the low-frequency side of the system band 400 becomes a band that cannot be used for transmission of an SRS. In the below, this band will be called an "SRS transmission disabling band 460." Each base station 1 cannot allocate, as a use uplink resource for SRS, to the communication terminal 2 an uplink radio resource including, in the frequency direction, a frequency band included in the SRS transmission disabling band 460.

The SRS transmission disabling band 460 is common among all the base stations 1. This makes the SRS transmission disabling band 460 that cannot be allocated for SRS transmission to the communication terminal 2 by some base station 1 in each unit period 360 agree with the SRS transmission disabling band 460 that cannot be allocated for SRS transmission to the communication terminal 2 by a peripheral base station 1 existing in a peripheral area of the former base station 1.

If the system bandwidth is 10 MHz in this embodiment, the system band 400 includes 50 RBs. In this case, the SRS transmission enabling band 450 has a bandwidth corresponding to the frequency bandwidth of 40 RBs, and the SRS transmission disabling band 460 has a bandwidth corresponding to the frequency bandwidth of 10 RBs. In the below, the frequency bandwidth of x RBs is called an "xRB."

<Structure of SRS>

The radio communication system 100 of this embodiment defines two types of SRSs identified by a parameter $k_{TC}$ called "transmissionComb." Each communication terminal 2 transmits one of these two types of SRSs in at least one of the first and second uplink communication periods 370a and 370b for SRS.

The parameter $k_{TC}$ can assume a value "0" or "1." A plurality of subcarriers SC0 used for transmission of an SRS specified by the parameter $k_{TC}=0$ (hereinafter called "SRS0") is arranged not consecutively but in a comb-like pattern in the frequency direction. In other words, the carrier frequency of the SRS0 is arranged in a comb-like pattern in the frequency direction. Likewise, a plurality of subcarriers SC1 used for transmission of an SRS specified by the parameter $k_{TC}=1$ (hereinafter called "SRS1") is arranged in a comb-like pattern in the frequency direction. If the SRS0 and the SRS1 are to be transmitted in the same frequency band, the subcarriers SRS0 used for transmission of this SRS0 and the subcarriers SC1 used for transmission of this SRS1 are arranged alternately in the frequency direction. Thus, the carrier frequency of the SRS0 and that of the SRS1 do not overlap each other in the frequency direction.

Figure 6:
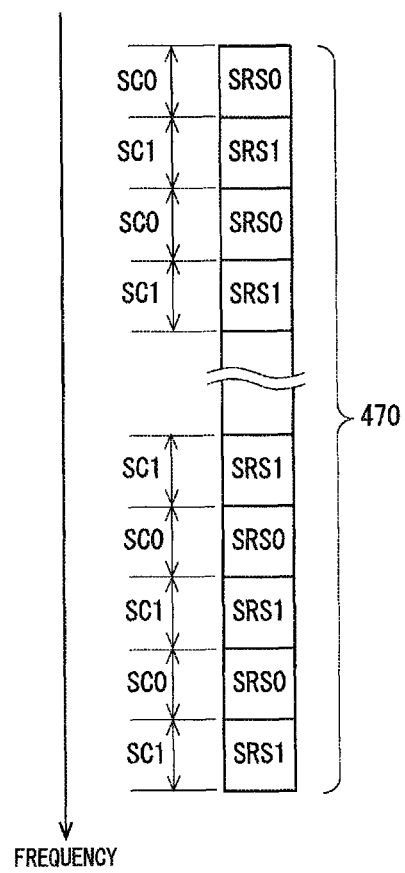
FIG. 6 shows an SRS0 and an SRS1.

FIG. 6 shows how both the SRS0 and the SRS1 are transmitted in a frequency band 470. As shown in FIG. 6, the subcarriers SRS0 used for transmission of the SRS0 are arranged at intervals of one subcarrier in the frequency direction. Likewise, the subcarriers SC1 used for transmission of the SRS1 are arranged at intervals of one subcarrier in the frequency direction. Further, the subcarriers SRS0 and the subcarriers SC1 existing in the same frequency band 470 are arranged alternately in the frequency direction.

As described above, a plurality of subcarriers used for transmission of an SRS by one communication terminal 2 is arranged in a comb-like pattern in the frequency direction. Thus, half of the subcarriers existing in a frequency band used for transmission of an SRS by this communication terminal 2 are used for transmission of this SRS. Further, the subcarriers SRS0 and the subcarriers SC1 existing in the same frequency band are arranged alternately, so that the communication terminal 2 to transmit the SRS0 and the communication terminal 2 to transmit the SRS1 can share the same frequency band in the same uplink communication period for SRS. From the viewpoint of the base station 1, the base station 1 can distinguish between the SRS0 and the SRS1 transmitted in the same frequency band in the same uplink communication period for SRS.

Standards of LTE allow each communication terminal 2 to transmit the SRS1 in the first uplink communication period 370a for SRS. However, in this embodiment, each communication terminal 2 is not allowed to transmit the SRS1 in the first uplink communication period 370a for SRS.

In the below, an uplink radio resource specified by the first uplink communication period 370a for SRS and the subcarriers SRS0 in a comb-like pattern existing in the SRS transmission enabling band 450 and usable for transmission of the SRS0 will be called a "first uplink radio resource 500a for SRS." An uplink radio resource specified by the second uplink communication period 370b for SRS and the subcarriers SRS0 in a comb-like pattern existing in the SRS transmission enabling band 450 and usable for transmission of the SRS0 will be called a "second uplink radio resource 500b for SRS." Further, an uplink radio resource specified by the second uplink communication period 370b for SRS and the subcarriers SC1 in a comb-like pattern existing in the SRS transmission enabling band 450 and usable for transmission of the SRS1 will be called a "third uplink radio resource 500c for SRS."

Figure 7:
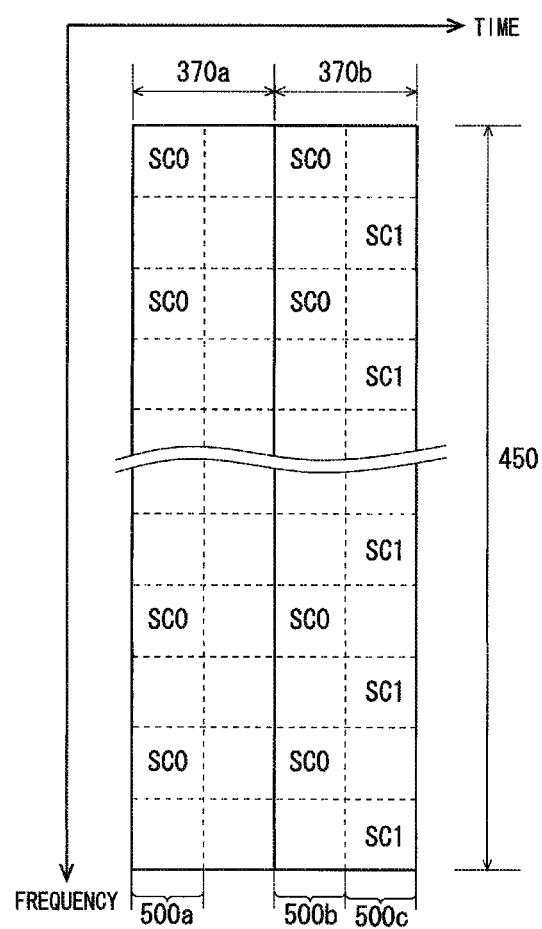
FIG. 7 shows an uplink radio resource for SRS.

FIG. 7 shows the first, second, and third uplink radio resources 500a, 500b, and 500c for SRS. As shown in FIG. 7, the first, second, and third uplink radio resources 500a, 500b, and 500c existing in the same unit period 360 differ from each other at least in one of the temporal and frequency directions. In the below, where there is no reason to distinguish between the first, second, and third uplink radio resources, these uplink radio resources each will be called an "uplink radio resource for SRS."

<Frequency Hopping of Transmission Frequency Band for SRS>

In the radio communication system 100 of this embodiment, a transmission frequency band for SRS can be subjected to frequency hopping within the SRS transmission enabling band 450. In the radio communication system 100, a transmission frequency bandwidth for SRS can be changed. In the radio communication system 100, three types of bandwidths covering 40 RBs, 20 RBs, and 4 RBs are defined for example as a bandwidth that can be defined as a transmission frequency bandwidth for SRS.

Figure 8:
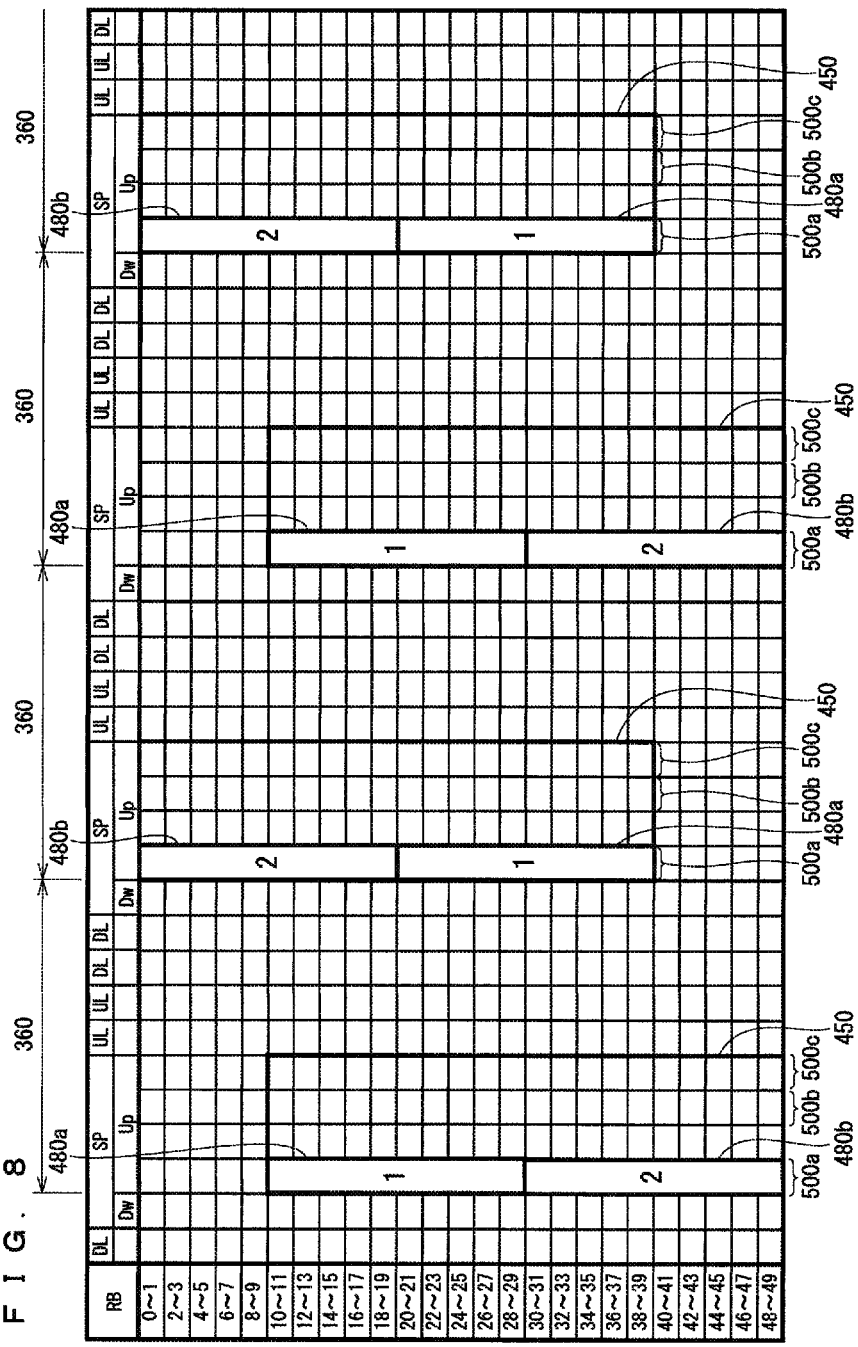
FIG. 8 shows frequency hopping of a transmission frequency band for SRS.

FIG. 8 shows an example where a transmission frequency band 480a for an SRS transmitted from the communication terminal 2 with a terminal number 1 is subjected to frequency hopping within the SRS transmission enabling band 450 and a transmission frequency band 480b for an SRS transmitted from the communication terminal 2 with a terminal number 2 is subjected to frequency hopping within the SRS transmission enabling band 450. FIG. 8 shows the subframes 302 in each of a plurality of consecutive unit periods 360. In FIG. 8, a lateral direction indicates the temporal direction and a vertical direction indicates the frequency direction. Numbers 0 to 49 shown in the leftmost part of FIG. 8 indicate the corresponding numbers of 50 RBs arranged in the frequency direction. A higher number given to an RB means that this RB is a greater RB. In FIG. 8, "SP" means the special subframe 302, "Up" means the uplink pilot time slot (UpPTS) 352, and "Dw" means the downlink pilot time slot (DwPTS) 351. Additionally, in FIG. 8, "UL" and "DL" mean the uplink and downlink subframes 302 respectively.

In the example of FIG. 8, the communication terminals 2 with the terminal numbers 1 and 2 each transmit an SRS once in each unit period 360. A transmission frequency bandwidth for an SRS transmitted from each of the communication terminals 2 with the terminal numbers 1 and 2 is determined to be 20 RBs. In the example of FIG. 8, the transmission frequency band 480a for an SRS transmitted from the communication terminal 2 with the terminal number 1 and the transmission frequency band 480b for an SRS transmitted from the communication terminal 2 with the terminal number 2 are arranged on a high-frequency side and a low-frequency side alternately within the SRS transmission enabling band 450 in units of one unit period 360.

More specifically, in the unit period 360 where the SRS transmission enabling band 450 is arranged on a high-frequency side, the transmission frequency band 480a is arranged on a low-frequency side within the SRS transmission enabling band 450. In the unit period 360 where the SRS transmission enabling band 450 is arranged on a low-frequency side, the transmission frequency band 480a is arranged on a high-frequency side within the SRS transmission enabling band 450. As a result, the transmission frequency band 480a is subjected to frequency hopping within a frequency band corresponding to 30 RBs (from $10^{th}$ to $39^{th}$ RBs) existing in a central portion of the system band. Thus, the communication terminal 2 with the terminal number 1 does not transmit an SRS in 10 RBs existing in an end portion on a low-frequency side of the system band and in 10 RBs existing in an end portion on a high-frequency side of the system band.

In contrast, in the unit period 360 where the SRS transmission enabling band 450 is arranged on a high-frequency side, the transmission frequency band 480b is arranged on a high-frequency side within the SRS transmission enabling band 450. In the unit period 360 where the SRS transmission enabling band 450 is arranged on a low-frequency side, the transmission frequency band 480b is arranged on a low-frequency side within the SRS transmission enabling band 450. As a result, the transmission frequency band 480b is arranged on a low-frequency side and a high-frequency side alternately of the system band. Thus, the communication terminal 2 with the terminal number 2 does not transmit an SRS in the frequency band of 10 RBs (from $20^{th}$ to $29^{th}$ RBs) existing in a central portion of the system band.

The scheduling executing unit 122 of this embodiment determines a mode of transmission of an SRS for each communication terminal 2 to communicate with the base station 1. More specifically, the scheduling executing unit 122 determines an uplink communication period for SRS to be used, the value of the SRS parameter $k_{TC}$, a transmission frequency bandwidth for the SRS, a mode of frequency hopping of a transmission frequency band for the SRS, and the like. As a result, a use uplink radio resource for SRS is allocated to each communication terminal 2 to communicate with the base station 1.

The transmission signal generating unit 120 generates a transmission signal containing control data to be used to notify the communication terminal 2 of a use uplink radio resource for SRS allocated to this communication terminal 2 by the scheduling executing unit 122, in other words, control data to be used to notify the communication terminal 2 of a mode of transmission of an SRS to be transmitted from this communication terminal 2 determined by the scheduling executing unit 122 (in the below, this control data will be called "SRS control data"). This transmission signal is transmitted from the communication unit 13 to this communication terminal 2 using the downlink subframe 302. As a result, the SRS control data is transmitted to each communication terminal 2, so that each communication terminal 2 can know an uplink radio resource to be used for transmitting an SRS. In other words, each communication terminal 2 can know a mode of transmission of an SRS to be transmitted from this communication terminal 2 itself. Each communication terminal 2 transmits an SRS using a use uplink radio resource for SRS announced from the base station 1.

The SRS control data may contain transmission start data to be used to instruct start of transmission of an SRS or transmission stop data to be used to instruct stop of transmission of an SRS. If the communication terminal 2 that is not transmitting an SRS receives the SRS control data containing the transmission start data, this communication terminal 2 starts to transmit an SRS using a use uplink radio resource for SRS contained in this SRS control data. If the communication terminal 2 that is transmitting an SRS receives the SRS control data containing the transmission stop data, this communication terminal 2 stops transmission of the SRS. For change of an uplink radio resource to be used by the communication terminal 2 for transmission of an SRS, this communication terminal 2 is notified of the SRS control data containing a new use uplink radio resource for SRS. According to LTE, the SRS control data is called "RRCConnectionReconfiguration message."

<Array Transmission Control>

In the array transmission control of this embodiment, in order for the communication unit 13 to make downlink communication using a use downlink radio resource allocated to the communication terminal 2, a transmission weight is obtained based on an SRS transmitted in the frequency band of this use downlink radio resource from the target communication terminal 2.

In the array transmission control of this embodiment, null steering and beamforming are performed simultaneously. The communication unit 13 updates a reception weight several times according to a sequential update algorithm such as an RLS (recursive least-squares) algorithm, and obtains a transmission weight based on the updated reception weight, thereby performing both null steering and beamforming simultaneously.

In the array transmission control of this embodiment, a transmission weight is obtained for each RB, for example. It is assumed for example that the frequency band of a use downlink radio resource allocated to the communication terminal 2 is composed of four RBs. In this case, for the array transmission control for this communication terminal 2, a transmission weight is obtained for each of these four RBs. In order to obtain a transmission weight to be applied to a signal to be transmitted to the communication terminal 2 using one RB in the frequency band of a use downlink radio resource, a reception weight is updated several times based on a plurality of complex symbols forming an SRS transmitted from this communication terminal 2 in this RB. Then, the transmission weight is obtained based on the updated reception weight.

<Association Between Downlink Radio Resource and Uplink Radio Resource for SRS>

In the radio communication system 100 of this embodiment, a downlink radio resource and an uplink radio resource for SRS are associated for beamforming and null steering based on an SRS. Each base station 1 allocates a use downlink radio resource to the communication terminal 2 to transmit an SRS and performs the array transmission control based on this association, thereby allowing each base station 1 to perform beamforming and null steering properly. In the below, this association will be called "resource association for array control." The resource association for array control is described next.

In the below, regarding two downlink subframes 302 in the unit period 360, the former downlink subframe 302 will be called a "first downlink subframe 302a" and the latter downlink subframe 302 will be called a "second downlink subframe 302b." Part of the special subframe 302 in the unit period 360 containing the downlink pilot time slot 351 is not the downlink subframe 302. However, this part will be called a "third downlink subframe 302c" for the sake of convenience. It is assumed that the subframe 302 described below includes the third downlink subframe 302c. Further, the unit period 360 targeted for the description will be called a "target unit period 360," and the communication terminal 2 targeted for the description will be called a "target communication terminal 2."

Figure 9:
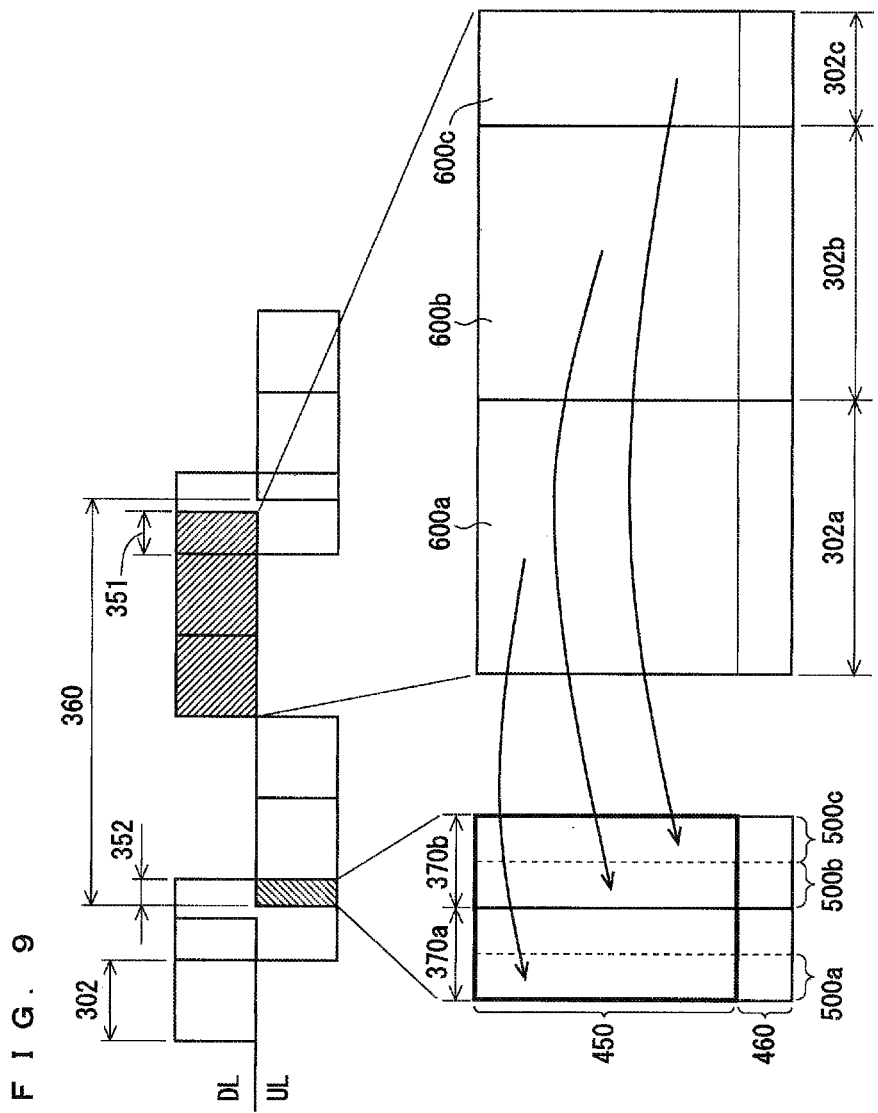
FIG. 9 shows association between an uplink radio resource for SRS and a downlink radio resource.

FIG. 9 shows association between a downlink radio resource and an uplink radio resource for SRS in the target unit period 360. The following description applies to each unit period 360.

In this embodiment, a downlink radio resource which is part of the first downlink subframe 302a in the target unit period 360 and which is contained in a downlink radio resource 600a including the SRS transmission enabling band 450 in the frequency direction is associated with an uplink radio resource which is part of the first uplink radio resource 500a for SRS in the target unit period 360 and which includes the frequency band of the corresponding downlink radio resource in the frequency direction. Specifically, the downlink radio resource contained in the downlink radio resource 600a in the target unit period 360 is associated with the uplink radio resource which is part of the first uplink radio resource 500a for SRS in the target unit period 360 and which has the same frequency band as that of the corresponding downlink radio resource.

A downlink radio resource which is part of the second downlink subframe 302b in the target unit period 360 and which is contained in a downlink radio resource 600b including the SRS transmission enabling band 450 in the frequency direction is associated with an uplink radio resource which is part of the second uplink radio resource 500b for SRS in the target unit period 360 and which includes the frequency band of the corresponding downlink radio resource in the frequency direction.

A downlink radio resource which is part of the third downlink subframe 302c in the target unit period 360 and which is contained in a downlink radio resource 600c including the SRS transmission enabling band 450 in the frequency direction is associated with an uplink radio resource which is part of the third uplink radio resource 500c for SRS in the target unit period 360 and which includes the frequency band of the corresponding downlink radio resource in the frequency direction.

Based on the aforementioned resource association for array control, each base station 1 allocates a use downlink radio resource to the communication terminal 2 and performs the array transmission control.

More specifically, for allocation of a use downlink radio resource from a downlink radio resource in the target unit period 360 to the target communication terminal 2, the scheduling executing unit 122 allocates, wherever possible, only a use downlink radio resource associated with an uplink radio resource with which the target communication terminal 2 transmits an SRS (in the below, such a use downlink radio resource will be called an "SRS-associated use downlink radio resource").

If an SRS-associated use downlink radio resource is insufficient for downlink communication with the communication terminal 2 in the unit period 360, the scheduling executing unit 122 allocates to the target communication terminal 2 a use downlink radio resource from a downlink radio resource in the target unit period 360 associated with an uplink radio resource with which the target communication terminal 2 does not transmit an SRS, or a use downlink radio recourse from the downlink radio resource in the target unit period 360 including at least part of the SRS transmission disabling band 460 in the frequency direction (in the below, these use downlink radio resources will be called collectively an "SRS-nonassociated use downlink radio resource"). In other words, the scheduling executing unit 122 allocates, as a use downlink radio resource, a downlink radio resource not associated with an uplink radio resource to be used for transmission of an SRS by the target communication terminal 2 in the target unit period 360.

In each base station 1, for downlink communication with the target communication terminal 2 using an SRS-associated use downlink radio resource allocated to the target communication terminal 2 by the scheduling executing unit 122, the communication unit 13 performs the array transmission control based on an SRS transmitted from the target communication terminal 2 using an uplink radio resource associated with this SRS-associated use downlink radio resource.

In each base station 1, for downlink communication with the target communication terminal 2 using an SRS-nonassociated use downlink radio resource allocated to the target communication terminal 2 by the scheduling executing unit 122, the communication unit 13 performs the array transmission control based on an SRS transmitted from the target communication terminal 2 using the frequency band of this SRS-nonassociated use downlink radio resource. In each base station 1, for downlink communication with the target communication terminal 2 using an SRS-nonassociated use downlink radio resource allocated to the target communication terminal 2 by the scheduling executing unit 122, the communication unit 13 does not perform the array transmission control if the target communication terminal 2 does not transmit an SRS using the frequency band of this SRS-nonassociated use downlink radio resource. Specifically, in this case, the communication unit 13 adopts omni transmission.

As described above, a transmission frequency band for an SRS is subjected to frequency hopping within the SRS transmission enabling band 450 (see FIG. 8). Hence, while an SRS-nonassociated use downlink radio resource is to be allocated to the target communication terminal 2 from a downlink radio resource in the target unit period 360, the target communication terminal 2 may have transmitted an SRS before the target unit period 360 using the frequency band of this SRS-nonassociated use downlink radio resource. In this case, the communication unit 13 performs the array transmission control based on this SRS.

Figure 10:
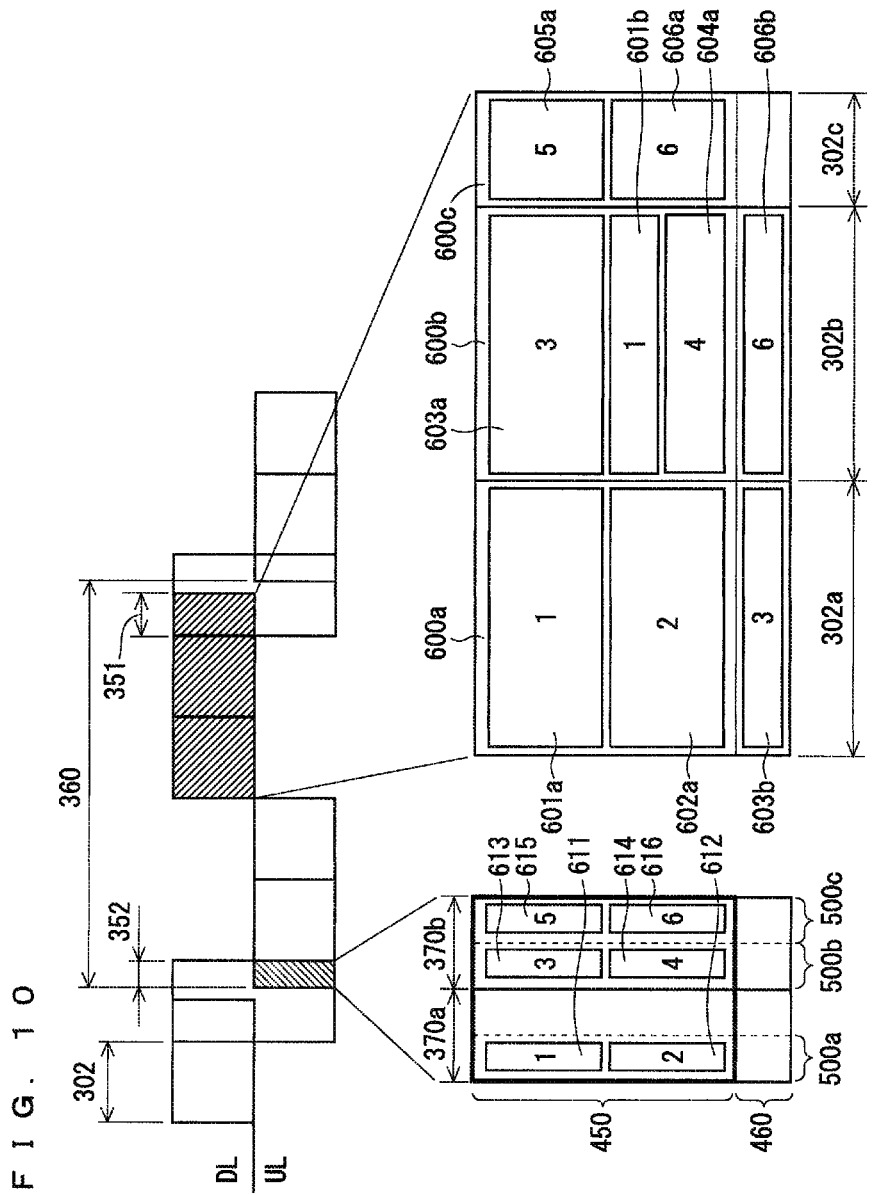
FIG. 10 shows an example of allocation of a use downlink radio resource to a communication terminal.

FIG. 10 shows an example of allocation of a use downlink radio resource to the communication terminals 2 with terminal numbers 1 to 6 in the target unit period 360. In the example of FIG. 10, a use uplink radio resource 611 for SRS is allocated to the communication terminal 2 with the terminal number 1 from the first uplink radio resource 500a for SRS. A use uplink radio resource 612 for SRS is allocated to the communication terminal 2 with the terminal number 2 from the first uplink radio resource 500a for SRS. A use uplink radio resource 613 for SRS is allocated to the communication terminal 2 with the terminal number 3 from the second uplink radio resource 500b for SRS. A use uplink radio resource 614 for SRS is allocated to the communication terminal 2 with the terminal number 4 from the second uplink radio resource 500b for SRS. A use uplink radio resource 615 for SRS is allocated to the communication terminal 2 with the terminal number 5 from the third uplink radio resource 500c for SRS. A use uplink radio resource 616 for SRS is allocated to the communication terminal 2 with the terminal number 6 from the third uplink radio resource 500c for SRS.

In the example of FIG. 10, an SRS-associated use downlink radio resource 602a having the same frequency band as that of the use uplink radio resource 612 for SRS is allocated to the communication terminal 2 with the terminal number 2, whereas an SRS-nonassociated use downlink radio resource is not allocated to the communication terminal 2 with the terminal number 2. An SRS-associated use downlink radio resource 604a having a frequency band being part of the frequency band of the use uplink radio resource 614 for SRS is allocated to the communication terminal 2 with the terminal number 4, whereas an SRS-nonassociated use downlink radio resource is not allocated to the communication terminal 2 with the terminal number 4. An SRS-associated use downlink radio resource 605a having the same frequency band as that of the use uplink radio resource 615 for SRS is allocated to the communication terminal 2 with the terminal number 5, whereas an SRS-nonassociated use downlink radio resource is not allocated to the communication terminal 2 with the terminal number 5.

Meanwhile, an SRS-associated use downlink radio resource 601a having the same frequency band as that of the use uplink radio resource 611 for SRS and additionally, an SRS-nonassociated use downlink radio resource 601b are allocated to the communication terminal 2 with the terminal number 1. An SRS-associated use downlink radio resource 603a having the same frequency band as that of the use uplink radio resource 613 for SRS and additionally, an SRS-nonassociated use downlink radio resource 603b are allocated to the communication terminal 2 with the terminal number 3. An SRS-associated use downlink radio resource 606a having the same frequency band as that of the use uplink radio resource 616 for SRS and additionally, an SRS-nonassociated use downlink radio resource 606b are allocated to the communication terminal 2 with the terminal number 6.

The respective frequency bands of the SRS-nonassociated use downlink radio resources 603b and 606b are part of the SRS transmission disabling band 460 in the target unit period 360 where an SRS is not transmitted. The frequency band of the SRS-nonassociated use downlink radio resource 601b allocated to the communication terminal 2 with the terminal number 1 is part of the frequency band of the use uplink radio resource 614 for SRS allocated to the communication terminal 2 with the terminal number 4.

As shown in FIG. 10, in this embodiment, if an SRS-associated use downlink radio resource and an SRS-nonassociated use downlink radio resource are allocated to the communication terminal 2 in the target unit period 360, these downlink radio resources are allocated from different downlink subframes 302. Accordingly, both an SRS-associated use downlink radio resource and an SRS-nonassociated use downlink radio resource will not be allocated within one downlink subframe 302 to the same communication terminal 2. Specifically, in each downlink subframe 302, the scheduling executing unit 122 allocates only one of an SRS-associated use downlink radio resource and an SRS-nonassociated use downlink radio resource to one communication terminal 2.

In the radio communication system 100, each base station 1 uses an SRS-associated use downlink radio resource for downlink communication with the communication terminal 2, so that each base station 1 can perform beamforming and null steering properly, as will be described next.

Figure 11:
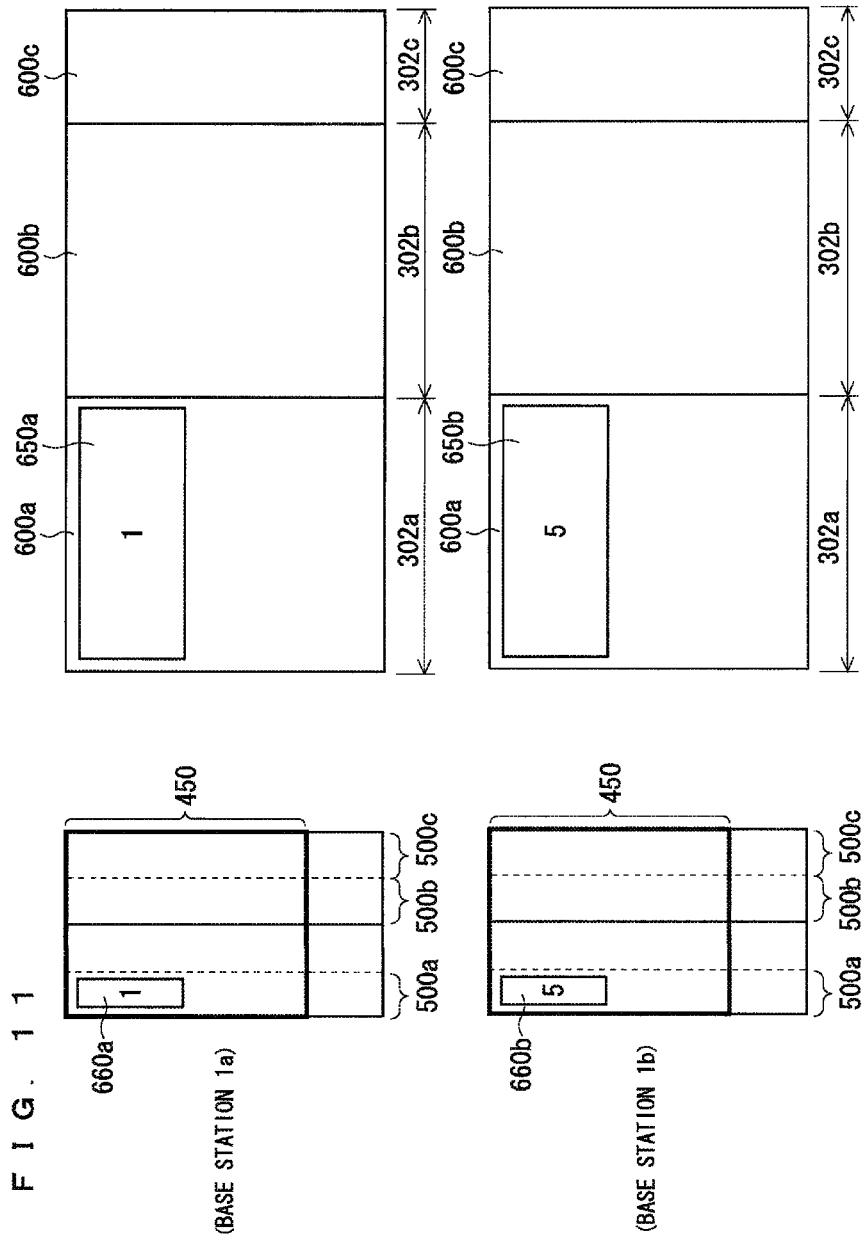
FIG. 11 describes beamforming and null steering.
Figure 12:
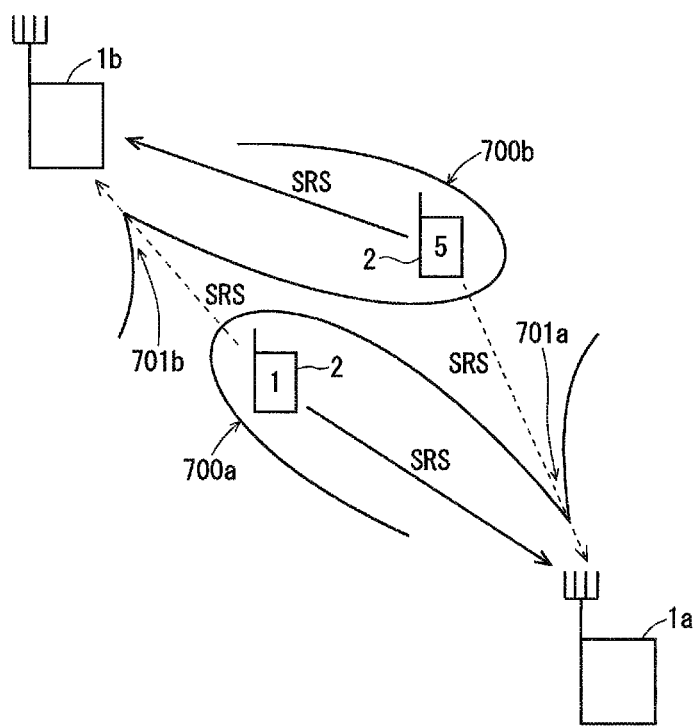
FIG. 12 describes beamforming and null steering.

FIGS. 11 and 12 explain how each of a base station 1a and a base station 1b existing in a peripheral area of the base station 1a performs beamforming and null steering properly using an SRS-associated use downlink radio resource. FIG. 11 shows an example of allocation of an SRS-associated use downlink radio resource in the target unit period 360 by each of the base stations 1a and 1b. FIG. 12 shows a beam and a null in the target unit period 360 relating to the transmission directivity of each of the base stations 1a and 1b.

In the examples of FIGS. 11 and 12, the base station 1a makes downlink communication with the communication terminal 2 with the terminal number 1 in the target unit period 360 using an SRS-associated use downlink radio resource 650a. The base station 1b makes downlink communication with the communication terminal 2 with the terminal number 5 in the target unit period 360 using an SRS-associated use downlink radio resource 650b same as the SRS-associated use downlink radio resource 650a. Hence, downlink communication between the base station 1a and the communication terminal 2 with the terminal number 1 might interfere with the communication terminal 2 with the terminal number 5 making downlink communication with the base station 1b existing in a peripheral area of the base station 1a. Likewise, downlink communication between the base station 1b and the communication terminal 2 with the terminal number 5 might interfere with the communication terminal 2 with the terminal number 1 making downlink communication with the base station 1a existing in a peripheral area of the base station 1b.

In the examples of FIGS. 11 and 12, the SRS-associated use downlink radio resource 650a is allocated to the communication terminal 2 with the terminal number 1 from the downlink radio resource 600a in the first downlink subframe 302a including in the frequency direction the SRS transmission enabling band 450 in the target unit period 360. Likewise, the SRS-associated use downlink radio resource 650b is allocated to the communication terminal 2 with the terminal number 5 from the downlink radio resource 600a in the first downlink subframe 302a including in the frequency direction the SRS transmission enabling band 450 in the target unit period 360.

For downlink communication using the SRS-associated use downlink radio resource 650a, the base station 1a performs the array transmission control based on an SRS transmitted from the communication terminal 2 with the terminal number 1 using an uplink radio resource associated with the SRS-associated use downlink radio resource 650a, specifically, using an uplink radio resource 660a which is part of the first uplink radio resource 500a for SRS in the target unit period 360 and which includes the frequency band of the SRS-associated use downlink radio resource 650a in the frequency direction. For downlink communication using the SRS-associated use downlink radio resource 650b, the base station 1b performs the array transmission control based on an SRS transmitted from the communication terminal 2 with the terminal number 5 using an uplink radio resource associated with the SRS-associated use downlink radio resource 650b, specifically, using an uplink radio resource 660b which is part of the first uplink radio resource 500a for SRS in the target unit period 360 and which includes the frequency band of the SRS-associated use downlink radio resource 650b in the frequency direction.

In this way, for downlink communication with the communication terminal 2 with the terminal number 1 using the SRS-associated use downlink radio resource 650a, the base station 1a performs the array transmission control based on an SRS transmitted from the communication terminal 2 with the terminal number 1 in the same frequency band as that of the SRS-associated use downlink radio resource 650a. This makes a beam 700a relating to the transmission directivity of the base station 1a point toward the communication terminal 2 with the terminal number 1 as a communication counterpart, as shown in FIG. 12. As a result, the base station 1a performs beamforming properly.

Likewise, for downlink communication with the communication terminal 2 with the terminal number 5 using the SRS-associated use downlink radio resource 650b, the base station 1b performs the array transmission control based on an SRS transmitted from the communication terminal 2 with the terminal number 5 in the same frequency band as that of the SRS-associated use downlink radio resource 650b. This makes a beam 700b relating to the transmission directivity of the base station 1b point toward the communication terminal 2 with the terminal number 5 as a communication counterpart. As a result, the base station 1b performs beamforming properly.

If the base station 1a and the base station 1b existing in a peripheral area of the base station 1a make downlink communication using the same SRS-associated use downlink radio resource as in this example, the uplink radio resource 660a used for transmission of an SRS with which the base station 1a performs the array transmission control becomes the same as the uplink radio resource 660b used for transmission of an SRS with which the base station 1b performs the array transmission control. Hence, the SRS the base station 1a receives from the communication terminal 2 with the terminal number 1 in the uplink radio resource 660a contains, as an interference wave component, the SRS transmitted from the communication terminal 2 with the terminal number 5 communicating with the base station 1b. In response, the base station 1a calculates a transmission weight based on the SRS received from the communication terminal 2 with the terminal number 1 in the uplink radio resource 660a, and sets this transmission weight on a transmission signal to be transmitted to the communication terminal 2 with the terminal number 1 using the SRS-associated use downlink radio resource 650a. This makes a null 701a relating to the transmission directivity of the base station 1a point toward the communication terminal 2 with the terminal number 5 which communicates with the base station 1b and which is desired to be prevented from interference, as shown in FIG. 12. As a result, the base station 1a performs null steering properly.

From the viewpoint of the base station 1b, the SRS the base station 1b receives from the communication terminal 2 with the terminal number 5 in the uplink radio resource 660b contains, as an interference wave component, the SRS transmitted from the communication terminal 2 with the terminal number 1 communicating with the base station 1a. In response, the base station 1b calculates a transmission weight based on the SRS received from the communication terminal 2 with the terminal number 5 in the uplink radio resource 660b, and sets this transmission weight on a transmission signal to be transmitted to the communication terminal 2 with the terminal number 5 using the SRS-associated use downlink radio resource 650b. This makes a null 701b relating to the transmission directivity of the base station 1b point toward the communication terminal 2 with the terminal number 1 which communicates with the base station 1a and which is desired to be prevented from interference, as shown in FIG. 12. As a result, the base station 1b performs null steering properly.

In this way, if the base station 1 and the peripheral base station 1 existing in a peripheral area of the former base station 1 make downlink communication using the same SRS-associated use downlink radio resource, each of the base station 1 and the peripheral base station 1 performs beamforming and null steering properly. In contrast, if the base station 1 uses an SRS-nonassociated use downlink radio resource for downlink communication with the communication terminal 2, the base station 1 cannot perform null steering properly while it could perform beamforming properly.

It is assumed that the base station 1 uses an SRS-nonassociated use downlink radio resource for downlink communication with the communication terminal 2 and this communication terminal 2 transmits an SRS in the same frequency band as that of this SRS-nonassociated use downlink radio resource. In this case, the base station 1 performs the array transmission control based on this SRS. This makes a beam relating to the transmission directivity of the array antenna 110 of the base station 1 point toward this communication terminal 2. As a result, the base station 1 can perform beamforming properly as in the case where the base station 1 uses an SRS-associated use downlink radio resource.

Meanwhile, the following case is considered where the base station 1 and the peripheral base station 1 existing in a peripheral area of the former base station 1 make downlink communication using the same use downlink radio resource, where the base station 1 uses an SRS-nonassociated use downlink radio resource, where the communication terminal 2 as a communication counterpart of the base station 1 transmits an SRS in the same frequency band as that of this SRS-nonassociated use downlink radio resource, and where the peripheral base station 1 uses an SRS-associated use downlink radio resource. In this case, as understood from the foregoing explanation, the SRS used by the base station 1 for the array transmission control and an SRS used by the peripheral base station 1 for the array transmission control are transmitted using different uplink radio resources. Hence, the SRS used by the base station 1 for the array transmission control does not contain, as an interference wave component, the SRS from the communication terminal 2 communicating with the peripheral base station 1. Further, the SRS used by the peripheral base station 1 for the array transmission control does not contain, as an interference wave component, the SRS from the communication terminal 2 communicating with the base station 1. This makes it impossible for the base station 1 to make a null relating to the transmission directivity of the array antenna 110 thereof point toward the communication terminal 2 communicating with the peripheral base station 1, while making it impossible for the peripheral base station 1 to make a null relating to the transmission directivity of the array antenna 110 thereof point toward the communication terminal 2 communicating with the base station 1. As a result, both the base station 1 and the peripheral base station 1 become unable to perform null steering properly.

As described above, if the base station 1 uses an SRS-nonassociated use downlink radio resource for downlink communication with the communication terminal 2, the base station 1 cannot perform null steering properly. Thus, as described above, each base station 1 tries to allocate an SRS-associated use downlink radio resource to the communication terminal 2 wherever possible.

<Action by Base Station Relating to Receipt of CQI from Communication Terminal>

Figure 13:
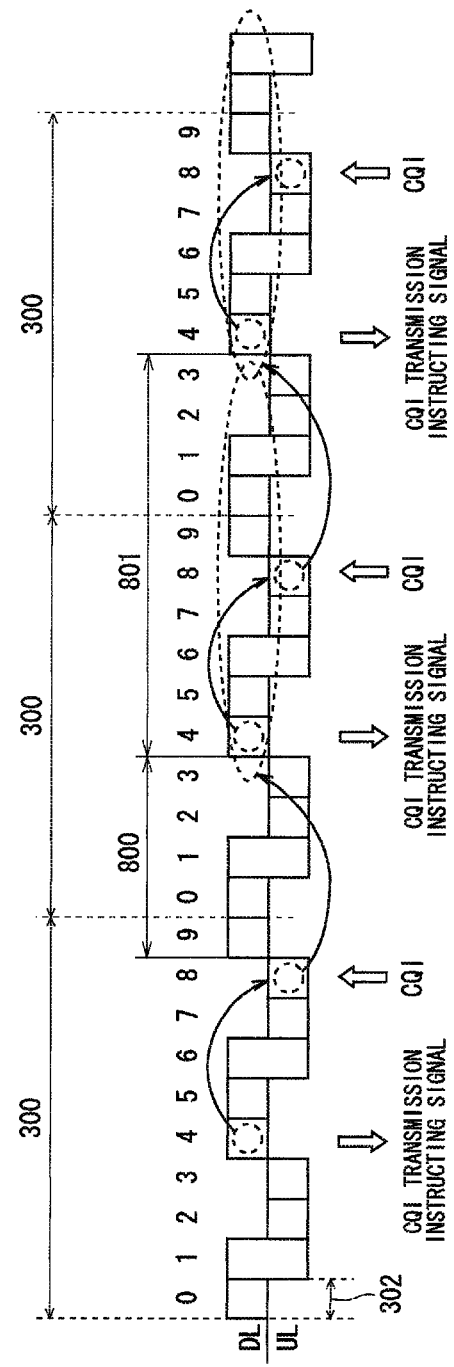
FIG. 13 shows action by the radio communication system.

FIG. 13 shows an example of action in the radio communication system 100 taken by the base station 1 to receive a CQI from the target communication terminal 2. In the base station 1 of this embodiment, the communication unit 13 transmits a CQI transmission instructing signal instructing transmission of a CQI to each communication terminal 2 at regular intervals. A transmission cycle 801 of the CQI transmission instructing signal is 10 ms, for example. In the example of FIG. 13, the base station 1 transmits the CQI transmission instructing signal to the target communication terminal 2 in the fourth subframe 302 of each TDD frame 300.

After receiving the CQI transmission instructing signal from the base station 1, each communication terminal 2 obtains the quality of downlink communication with the base station 1 such as an SNR (signal to interference plus noise power ratio) based on a reference signal transmitted from the base station 1 in the subframe 302 in which the CQI transmission instructing signal is received. The reference signal is a known signal. The base station 1 transmits the same reference signal simultaneously to the communication terminals 2. Accordingly, the communication unit 13 of the base station 1 does not perform the array transmission control for transmission of the reference signal but transmits the reference signal in an omni mode.

After obtaining the quality of downlink communication with the base station 1, each communication terminal 2 generates a CQI indicating this downlink communication quality. Then, each communication terminal 2 transmits to the base station 1a transmission signal containing the generated CQI in the fourth subframe 302 after the subframe 302 in which the CQI transmission instructing signal is received, for example. In the example of FIG. 13, the target communication terminal 2 transmits the CQI in the eighth subframe 302 of each TDD frame 300.

The communication terminal 2 obtains the quality of downlink communication with the base station 1 in units of one RB. Accordingly, the communication terminal 2 generates a CQI in units of one RB. The communication terminal 2 informs the base station 1 of a CQI relating to each RB in the system band 400.

After receiving a CQI from the communication terminal 2, the base station 1 uses the received CQI for process relating to downlink communication to be made in the subframe 302 to come after an interval of a delay time 800 starting from the end of the subframe 302 in which the CQI is received and in the subsequent subframes 302. The process relating to downlink communication mentioned herein includes downlink scheduling of the downlink subframe 302 and determining an MCS to be applied to a transmission signal to be transmitted in the downlink subframe 302. The delay time 800 is 5 ms, for example.

After receiving a new CQI from the communication terminal 2, the base station 1 uses the newly received CQI for process relating to downlink communication to be made in the subframe 302 to come after an interval of the delay time 800 starting from the end of the subframe 302 in which this new CQI is received and in the subsequent subframes 302.

In this embodiment, the communication terminal 2 transmits a CQI at intervals of 10 ms. Accordingly, the base station 1 uses a received CQI for process relating to downlink communication to be made in ten subframes 302 including the subframe 302 (in the example of FIG. 13, the fourth subframe 302) to come after an interval of the delay time 800 after the end of the subframe 302 in which this CQI is received and its subsequent subframes 302. A period covering these ten subframes 302 is called a "CQI application period."

As described above, an interval takes some time from when the communication terminal 2 generates a CQI until when this CQI is reflected in downlink scheduling and determining an MCS in the base station 1. Accordingly, the base station 1 might perform process relating to downlink communication based on a CQI of low accuracy.

In response, in this embodiment, a CQI received from the communication terminal 2 is corrected to enhance the accuracy of the received CQI, as described later.

<Action by Base Station Relating to Receipt of ACK/NACK Signal from Communication Terminal>

In this embodiment, after receiving a transmission signal transmitted from the base station 1 using the downlink subframe 302, each communication terminal 2 notifies the base station 1 of an ACK/NACK signal in units of the downlink subframe 302. The ACK/NACK signal is a response signal indicating whether data in the transmission signal has been received properly. Specifically, each communication terminal 2 transmits one ACK/NACK signal in response to a transmission signal transmitted from the base station 1 using one downlink subframe 302. The ACK/NACK signal contains an ACK signal indicating that data has been received properly or an NACK signal indicating that data has not been received properly.

FIG. 14 shows an example of action in the radio communication system 100 taken by the base station 1 to receive an ACK/NACK signal from the target communication terminal 2. As shown in FIG. 14, if the base station 1 transmits data to the target communication terminal 2 in the downlink subframe 302 corresponding to the fourth subframe 302, the target communication terminal 2 generates an ACK/NACK signal indicating whether this data has been received properly. Then, the target communication terminal 2 transmits to the base station 1 the generated ACK/NACK signal in the fourth subframe 302 after the subframe 302 in which the data is received, for example.

After receiving the ACK/NACK signal from the target communication terminal 2, the base station 1 uses the received ACK/NACK signal for process relating to downlink communication to be made in the subframe 302 to come after an interval of a delay time 810 starting from the end of the subframe 302 in which the ACK/NACK signal is received or in the subsequent subframe 302. This process relating to downlink communication includes downlink scheduling and retransmission control, for example. The delay time 810 is 5 ms, for example.

As described above, an interval takes some time from when the communication terminal 2 generates an ACK/NACK signal until when this ACK/NACK signal is reflected in downlink scheduling or retransmission control in the base station 1.

<Method of Calculating Correction Value Used to Correct CQI>

The correction value calculating unit 126 of this embodiment calculates a correction value used to correct a CQI announced from the communication terminal 2 based on an ACK/NACK signal transmitted from this communication terminal 2. After the correction value calculating unit 126 calculates the correction value, the base station 1 corrects the CQI announced from the communication terminal 2 using the calculated correction value. Then, the base station 1 performs process relating to downlink communication including downlink scheduling and determining an MCS to be applied in downlink communication using the corrected CQI.

A correction value used to correct a CQI obtained by the correction value calculating unit 126 of this embodiment includes a first correction value responsive to an SRS-associated use downlink radio resource and a second correction value responsive to an SRS-nonassociated use downlink radio resource. A corrected CQI is obtained by correcting a CQI announced from the communication terminal 2 with the first correction value. The base station 1 uses a downlink communication quality indicated by this corrected CQI as a downlink communication quality determined when downlink communication is made with this communication terminal 2 using an SRS-associated use downlink radio resource. Meanwhile, a corrected CQI is obtained by correcting a CQI announced from the communication terminal 2 with the second correction value. The base station 1 uses a downlink communication quality indicated by this corrected CQI as a downlink communication quality determined when downlink communication is made with this communication terminal 2 using an SRS-nonassociated use downlink radio resource.

The correction value calculating unit 126 calculates the first correction value for the communication terminal 2 based on an ACK/NACK signal transmitted from this communication terminal 2 indicating whether this communication terminal 2 has properly received a transmission signal transmitted from the base station 1 using an SRS-associated use downlink radio resource. The correction value calculating unit 126 calculates the second correction value for the communication terminal 2 based on an ACK/NACK signal transmitted from this communication terminal 2 indicating whether this communication terminal 2 has properly received a transmission signal transmitted from the base station 1 using an SRS-nonassociated use downlink radio resource. The action by the correction value calculating unit 126 is described in detail below.

In the below, an ACK/NACK signal transmitted from the communication terminal 2 indicating whether this communication terminal 2 has properly received a transmission signal transmitted from the base station 1 using an SRS-associated use downlink radio resource will be called an "SRS-associated ACK/NACK signal." An ACK/NACK signal transmitted from the communication terminal 2 indicating whether this communication terminal 2 has properly received a transmission signal transmitted from the base station 1 using an SRS-nonassociated use downlink radio resource will be called an "SRS-nonassociated ACK/NACK signal."

FIG. 15 is a flowchart showing how the correction value calculating unit 126 acts in response to receipt of an ACK/NACK signal from the target communication terminal 2 by the communication unit 13. The correction value calculating unit 126 performs the process shown in FIG. 15 each time the communication unit 13 receives an ACK/NACK signal from the target communication terminal 2. The correction value calculating unit 126 performs the process shown in FIG. 15 for each communication terminal 2 while communication is being made with this communication terminal 2.

In this embodiment, the correction value calculating unit 126 determines whether a first adjustment value is to be added to or subtracted from a current first correction value based on an SRS-associated ACK/NACK signal. The correction value calculating unit 126 adds the first adjustment value to or subtracts the first adjustment value from the current first correction value to update the first correction value, thereby calculating a new first correction value.

Likewise, the correction value calculating unit 126 determines whether a second adjustment value is to be added to or subtracted from a current second correction value based on an SRS-nonassociated ACK/NACK signal. The correction value calculating unit 126 adds the second adjustment value to or subtracts the second adjustment value from the current second correction value to update the second correction value, thereby calculating a new second correction value.

After the communication unit 13 receives an ACK/NACK signal from the target communication terminal 2, the received ACK/NACK signal is acquired by the received data acquiring unit 121. Then, as shown in FIG. 15, the correction value calculating unit 126 determines in step s1 whether the ACK/NACK signal acquired by the received data acquiring unit 121 is an SRS-associated ACK/NACK signal or an SRS-nonassociated ACK/NACK signal.

If determining in step s1 that the ACK/NACK signal received by the communication unit 13 is an SRS-associated ACK/NACK signal, the correction value calculating unit 126 adds "1" to the number of receipts X1 of an SRS-associated ACK/NACK signal in step S2. Then, in step s3, the correction value calculating unit 126 determines whether the received SRS-associated ACK/NACK signal contains an NACK signal. If determining that the received SRS-associated ACK/NACK signal contains an NACK signal, the correction value calculating unit 126 adds "1" to the number of receipts Y1 of an NACK signal in an SRS-associated ACK/NACK signal in step s4. The number of receipts Y1 is considered to indicate the number of receiving errors about a transmission signal transmitted from the base station 1 using an SRS-associated use downlink radio resource and received by the target communication terminal 2.

If determining in step s3 that the received SRS-associated ACK/NACK signal does not contain an NACK signal, the correction value calculating unit 126 executes step s8 described later.

After step s4 is executed, the correction value calculating unit 126 determines in step s5 whether the number of receipts Y1 is larger than a first threshold TH1. Specifically, the correction value calculating unit 126 determines whether the number of receiving errors about a transmission signal transmitted from the base station 1 using an SRS-associated use downlink radio resource and received by the target communication terminal 2 is larger than the first threshold TH1. If determining that the number of receipts Y1 is larger than the first threshold TH1, the correction value calculating unit 126 determines in step s6 that a receiving error rate at the target communication terminal 2 is high. Then, the correction value calculating unit 126 subtracts the first adjustment value from the current first correction value to be used to correct a CQI from the target communication terminal 2. Specifically, if the number of receiving errors determined at the target communication terminal 2 is larger than the first threshold TH1, the correction value calculating unit 126 determines that an actual downlink communication quality determined when downlink communication is made with the target communication terminal 2 using an SRS-associated use downlink radio resource is lower than a downlink communication quality indicated by a CQI corrected with the current first correction value. Then, the correction value calculating unit 126 subtracts the first adjustment value from the current first correction value, thereby making a CQI from the target communication terminal 2 smaller.

The first correction value adjusted in step s6 is added to the latest CQI from the target communication terminal 2, thereby correcting this CQI. The corrected CQI is used for process at the base station 1 relating to downlink communication as a downlink quality value indicating a downlink communication quality determined when the base station 1 makes downlink communication with the target communication terminal 2 using an SRS-associated use downlink radio resource.

If determining in step s5 that the number of receipts Y1 is not larger than the first threshold TH1, the correction value calculating unit 126 executes step s8.

After step s6 is executed, the correction value calculating unit 126 initializes both the numbers of receipts X1 and Y1 to "0" in step s7. The correction value calculating unit 126 thereafter executes step s8.

In step s8, the correction value calculating unit 126 determines whether the number of receipts X1 of an SRS-associated ACK/NACK signal is larger than a second threshold TH2 (>TH1). If determining in step s8 that the number of receipts X1 is larger than the second threshold TH2, the correction value calculating unit 126 determines in step s9 that a receiving error rate at the target communication terminal 2 is low. Then, the correction value calculating unit 126 adds the first adjustment value to the first correction value to be used to correct a CQI from the target communication terminal 2. Specifically, if the number of receipts X1 becomes larger than the second threshold TH2 while the number of receipts Y1 does not exceed the first threshold TH1, the correction value calculating unit 126 determines that an actual downlink communication quality determined when downlink communication is made with the target communication terminal 2 using an SRS-associated use downlink radio resource is higher than a downlink communication quality indicated by a CQI corrected with the current first correction value. Then, the correction value calculating unit 126 adds the first adjustment value (>0) to the current first correction value, thereby making a CQI from the target communication terminal 2 larger.

The first correction value adjusted in step s9 is added to the latest CQI from the target communication terminal 2, thereby correcting this CQI. The corrected CQI is used for process at the base station 1 relating to downlink communication as a downlink quality value indicating a downlink communication quality determined when the base station 1 makes downlink communication with the target communication terminal 2 using an SRS-associated use downlink radio resource.

After step s9 is executed, the correction value calculating unit 126 initializes both the numbers of receipts X1 and Y1 to "0" in step s10.

In this way, the first correction value responsive to an SRS-associated use downlink radio resource is adjusted by adding the first adjustment value to or subtracting the first adjustment value from the first correction value. Each time the first correction value is adjusted, the adjusted first correction value is added to the latest CQI to correct this CQI. The CQI corrected with the first correction value is used for process relating to downlink communication in the aforementioned CQI application period corresponding to this CQI.

If it is determined in step s1 that the ACK/NACK signal received by the communication unit 13 is an SRS-nonassociated ACK/NACK signal, processes same as those in steps s2 to s10 are performed.

If determining in step s1 that the ACK/NACK signal received by the communication unit 13 is an SRS-nonassociated ACK/NACK signal, the correction value calculating unit 126 adds "1" to the number of receipts X2 of an SRS-nonassociated ACK/NACK signal in step s12. Then, in step s13, the correction value calculating unit 126 determines whether the received SRS-nonassociated ACK/NACK signal contains an NACK signal. If determining that the received SRS-nonassociated ACK/NACK signal contains an NACK signal, the correction value calculating unit 126 adds "1" to the number of receipts Y2 of an NACK signal in an SRS-nonassociated ACK/NACK signal in step s14. The number of receipts Y2 indicates the number of receiving errors about a transmission signal transmitted from the base station 1 using an SRS-nonassociated use downlink radio resource and received by the target communication terminal 2.

If determining in step s13 that the received SRS-nonassociated ACK/NACK signal does not contain an NACK signal, the correction value calculating unit 126 executes step s18 described later.

After step s14 is executed, the correction value calculating unit 126 determines in step s15 whether the number of receipts Y2 is larger than the first threshold TH1. Specifically, the correction value calculating unit 126 determines whether the number of receiving errors about a transmission signal transmitted from the base station 1 using an SRS-nonassociated use downlink radio resource and received by the target communication terminal 2 is larger than the first threshold TH1. If determining that the number of receipts Y2 is larger than the first threshold TH1, the correction value calculating unit 126 determines in step s16 that a receiving error rate at the target communication terminal 2 is high. Then, the correction value calculating unit 126 subtracts the second adjustment value (>0) from the current second correction value to be used to correct a CQI from the target communication terminal 2. Specifically, if the number of receiving errors determined at the target communication terminal 2 is larger than the first threshold TH1, the correction value calculating unit 126 determines that an actual downlink communication quality determined when downlink communication is made with the target communication terminal 2 using an SRS-nonassociated use downlink radio resource is lower than a downlink communication quality indicated by a CQI corrected with the current second correction value. Then, the correction value calculating unit 126 subtracts the second adjustment value from the current second correction value, thereby making a CQI from the target communication terminal 2 smaller.

The second correction value adjusted in step s16 is added to the latest CQI from the target communication terminal 2, thereby correcting this CQI. The corrected CQI is used for process at the base station 1 relating to downlink communication as a downlink quality value indicating a downlink communication quality determined when the base station 1 makes downlink communication with the target communication terminal 2 using an SRS-nonassociated use downlink radio resource.

If determining in step s15 that the number of receipts Y2 is not larger than the first threshold TH1, the correction value calculating unit 126 executes step s18.

After step s16 is executed, the correction value calculating unit 126 initializes both the numbers of receipts X2 and Y2 to "0" in step s17. The correction value calculating unit 126 thereafter executes step s18.

In step s18, the correction value calculating unit 126 determines whether the number of receipts X2 of an SRS-nonassociated ACK/NACK signal is larger than the second threshold TH2 (>TH1). If determining in step s18 that the number of receipts X2 is larger than the second threshold TH2, the correction value calculating unit 126 determines in step s19 that a receiving error rate at the target communication terminal 2 is low. Then, the correction value calculating unit 126 adds the second adjustment value to the second correction value to be used to correct a CQI from the target communication terminal 2. Specifically, if the number of receipts X2 becomes larger than the second threshold TH2 while the number of receipts Y2 does not exceed the first threshold TH1, the correction value calculating unit 126 determines that an actual downlink communication quality determined when downlink communication is made with the target communication terminal 2 using an SRS-nonassociated use downlink radio resource is higher than a downlink communication quality indicated by a CQI corrected with the current second correction value. Then, the correction value calculating unit 126 adds the second adjustment value to the current second correction value, thereby making a CQI from the target communication terminal 2 larger.

The second correction value adjusted in step s19 is added to the latest CQI from the target communication terminal 2, thereby correcting this CQI. The corrected CQI is used for process at the base station 1 relating to downlink communication as a downlink quality value indicating a downlink communication quality determined when the base station 1 makes downlink communication with the target communication terminal 2 using an SRS-nonassociated use downlink radio resource.

After step s19 is executed, the correction value calculating unit 126 initializes both the numbers of receipts X2 and Y2 to "0" in step s20.

In this way, the second correction value responsive to an SRS-nonassociated use downlink radio resource is adjusted by adding the second adjustment value to or subtracting the second adjustment value from the second correction value. Each time the second correction value is adjusted, the adjusted second correction value is added to the latest CQI to correct this CQI. The CQI corrected with the second correction value is used for process relating to downlink communication in the CQI application period corresponding to this CQI.

In this way, in this embodiment, the first correction value for the target communication terminal 2 is calculated based on an ACK/NACK signal (SRS-associated ACK/NACK signal) indicating whether the target communication terminal 2 has properly received a transmission signal transmitted from the base station 1 using an SRS-associated use downlink radio resource. The second correction value for the target communication terminal 2 is calculated based on an ACK/NACK signal (SRS-nonassociated ACK/NACK signal) indicating whether the target communication terminal 2 has properly received a transmission signal transmitted from the base station 1 using an SRS-nonassociated use downlink radio resource.

As described above, if the base station 1 and the peripheral base station 1 existing in a peripheral area of the former base station 1 make downlink communication using the same SRS-associated use downlink radio resource, each of the base station 1 and the peripheral base station 1 performs beamforming and null steering properly. Further, each base station 1 tries to allocate an SRS-associated use downlink radio resource to the communication terminal 2 wherever possible. Thus, if the base station 1 makes downlink communication with the communication terminal 2 using an SRS-associated use downlink radio resource, the peripheral base station 1 making downlink communication is very likely to make a null point toward this communication terminal 2. Specifically, the communication terminal 2 is unlikely to be interfered with its surrounding when receiving a transmission signal transmitted from the base station 1 using an SRS-associated use downlink radio resource. This allows the communication terminal 2 to properly and easily receive a transmission signal transmitted from the base station 1 using an SRS-associated use downlink radio resource. Thus, a receiving error rate relating to a transmission signal transmitted from the base station 1 using an SRS-associated use downlink radio resource becomes low at the communication terminal 2.

In contrast, if the base station 1 makes downlink communication with the communication terminal 2 using an SRS-nonassociated use downlink radio resource, the peripheral base station 1 making downlink communication is unlikely to make a null point toward this communication terminal 2, as understood from the foregoing explanation. Specifically, the communication terminal 2 is likely to be interfered with its surrounding easily when receiving a transmission signal transmitted from the base station 1 using an SRS-nonassociated use downlink radio resource. Accordingly, the communication terminal 2 finds difficulty in receiving a transmission signal transmitted from the base station 1 using an SRS-nonassociated use downlink radio resource. Thus, a receiving error rate relating to a transmission signal transmitted from the base station 1 using an SRS-nonassociated use downlink radio resource becomes high at the communication terminal 2.

As described above, a receiving error rate relating to a transmission signal transmitted from the base station 1 using an SRS-associated use downlink radio resource tends to become lower at the communication terminal 2. In contrast, a receiving error rate relating to a transmission signal transmitted from the base station 1 using an SRS-nonassociated use downlink radio resource tends to become higher at the communication terminal 2. Accordingly, regarding a relationship between the first correction value responsive to an SRS-associated use downlink radio resource and the second correction value responsive to an SRS-nonassociated use downlink radio resource determined for the target communication terminal 2, the first correction value tends to be larger than the second correction value. As an example, the first correction value is "+4" whereas the second correction value is "1."

The first and second adjustment values used to adjust the first and second correction values respectively may be the same or different. Meanwhile, it is preferable that the second adjustment value be smaller than the first adjustment value, as understood for the reason given below.

As described above, if the base station 1 makes downlink communication with the communication terminal 2 using an SRS-nonassociated use downlink radio resource, the peripheral base station 1 making downlink communication is unlikely to make a null point toward this communication terminal 2. Hence, this communication terminal 2 is likely to be interfered with its surrounding easily when receiving a transmission signal transmitted from the base station 1. Accordingly, the quality of downlink communication between this communication terminal 2 and the base station 1 is likely to change easily.

As described, change may be caused easily in the quality of downlink communication between the base station 1 and the communication terminal 2 with which this base station 1 makes downlink communication using an SRS-nonassociated use downlink radio resource. Accordingly, if the second adjustment value used to adjust the second correction value for this communication terminal 2 is increased to increase the amount of one adjustment of this second correction value, a downlink communication quality indicated by a CQI corrected with the adjusted second correction value might be different largely from an actual quality of downlink communication between this communication terminal 2 and the base station 1. In light of this aspect, it is preferable that the second adjustment value be smaller than the first adjustment value.

<Method of Determining MCS Using CQI>

The radio communication system 100 of this embodiment definers M (M≥2) MCSs composed of different combinations of a modulation system and a code rate. Long Term Evolution defines 29 MCSs. The M MCSs are given ranks ranging from a rank zero to a rank (M−1). A higher rank means a higher throughput determined instantaneously at the base station 1 based on a combination of a modulation system and a code rate of an MCS corresponding to the rank. The MCS determining unit 125 selects an MCS from the M MCSs that is to be applied to a transmission signal to be transmitted from the communication unit 13 to the communication terminal 2.

In this embodiment, an MCS to be applied to a transmission signal to be transmitted using an SRS-associated use downlink radio resource (hereinafter called an "SRS-associated MCS") is determined based on a CQI corrected with the first correction value. Specifically, the MCS determining unit 125 regards a downlink communication quality indicated by a CQI corrected with the first correction value as a downlink communication quality determined when downlink communication is made using an SRS-associated use downlink radio resource, and determines an MCS to be applied to a transmission signal to be transmitted using this SRS-associated use downlink radio resource.

An MCS to be applied to a transmission signal to be transmitted using an SRS-nonassociated use downlink radio resource (hereinafter called an "SRS-nonassociated MCS") is determined based on a CQI corrected with the second correction value. Specifically, the MCS determining unit 125 regards a downlink communication quality indicated by a CQI corrected with the second correction value as a downlink communication quality determined when downlink communication is made using an SRS-nonassociated use downlink radio resource, and determines an MCS to be applied to a transmission signal to be transmitted using this SRS-nonassociated use downlink radio resource.

In this embodiment, an SRS-associated MCS and an SRS-nonassociated MCS are both determined in units of the downlink subframe 302.

The following describes in detail a method of determining an SRS-associated MCS and a method of determining an SRS-nonassociated MCS. The downlink subframe 302 targeted for the description will be called a "target downlink subframe 302."

FIG. 16 describes a method of determining an SRS-associated MCS in the target downlink subframe 302. In FIG. 16, a CQI before correction is shown in the leftmost part and a corrected CQI corrected with the first correction value is shown in a second part from the left. Further, in FIG. 16, an average of corrected CQIs is shown in a second part from the right and a determined rank of an SRS-associated MCS is shown in the rightmost part.

In the example of FIG. 16, an SRS-associated use downlink radio resource containing eight RBs 840a to 840h arranged in the frequency direction is allocated from the target downlink subframe 302 to the target communication terminal 2. Eight CQI values "8," "7," "6," "8," "6," "5," "7" and "8" announced from the target communication terminal 2 correspond to the eight RBs 840a to 840h respectively. In FIG. 16, a CQI value corresponding to one RB is given in a rectangle showing this RB.

As shown in FIG. 16, if the first correction value adjusted in the way of FIG. 15 is "+4," for example, the MCS determining unit 125 adds "+4" to each of the eight CQI values announced from the target communication terminal 2 and corresponding to the eight RBs 840a to 840h. The eight CQI values corrected with the first correction value become "12," "11," "10," "12," "10," "9," "11" and "12."

Next, the MCS determining unit 125 obtains an average of the eight CQIs corrected with the first correction value. In the example of FIG. 16, this average is "10.9." Then, the MCS determining unit 125 selects an MCS from the M MCSs that is responsive to the average of the eight CQIs corrected with the first correction value. Specifically, where the quality of downlink communication between the target communication terminal 2 and the base station 1 is a downlink communication quality indicated by this average, the MCS determining unit 125 determines an MCS, specifically a modulation system and a code rate that allow the target communication terminal 2 to properly receive a transmission signal from the base station 1. In the example of FIG. 16, this average is "10.9" and an MCS responsive to this average is an MCS in a rank 15. The MCS determined in this way becomes an SRS-associated MCS. The MCS determining unit 125 determines an SRS-associated MCS in units of the downlink subframe 302.

For downlink communication with the target communication terminal 2 using an SRS-associated use downlink radio resource in the target downlink subframe 302, the communication unit 13 adopts an SRS-associated MCS in the target downlink subframe 302 determined by the MCS determining unit 125 into a transmission signal to be transmitted using this SRS-associated use downlink radio resource. This allows the target communication terminal 2 to properly receive a transmission signal transmitted from the base station 1 using an SRS-associated use downlink radio resource.

FIG. 17 describes a method of determining an SRS-nonassociated MCS in the target downlink subframe 302. In FIG. 17, like in FIG. 16, a CQI before correction is shown in the leftmost part and a corrected CQI corrected with the second correction value is shown in a second part from the left. Further, in FIG. 17, an average of corrected CQIs is shown in a second part from the right and a determined rank of an SRS-nonassociated MCS is shown in the rightmost part.

In the example of FIG. 17, an SRS-nonassociated use downlink radio resource containing eight RBs 850a to 850h arranged in the frequency direction is allocated from the target downlink subframe 302 to the target communication terminal 2. Eight CQI values "8," "7," "5," "6," "8," "6," "7" and "8" announced from the target communication terminal 2 correspond to the eight RBs 850a to 850h respectively. In FIG. 17, a CQI value corresponding to one RB is also given in a rectangle showing this RB.

As shown in FIG. 17, if the second correction value adjusted in the way of FIG. 15 is "+1," for example, the MCS determining unit 125 adds "+1" to each of the eight CQI values announced from the target communication terminal 2 and corresponding to the eight RBs 850a to 850h. The eight CQI values corrected with the second correction value become "9," "8," "6," "7," "9," "7," "8" and "9."

Next, the MCS determining unit 125 obtains an average of the eight CQIs corrected with the second correction value. In the example of FIG. 17, this average is "7.9." Then, the MCS determining unit 125 selects an MCS from the M MCSs that is responsive to the average of the eight CQIs corrected with the second correction value. In the example of FIG. 17, this average is "7.9" and an MCS responsive to this average is an MCS in a rank 10. The MCS determined in this way becomes an SRS-nonassociated MCS. The MCS determining unit 125 determines an SRS-nonassociated MCS in units of the downlink subframe 302.

For downlink communication with the target communication terminal 2 using an SRS-nonassociated use downlink radio resource in the target downlink subframe 302, the communication unit 13 adopts an SRS-nonassociated MCS in the target downlink subframe 302 determined by the MCS determining unit 125 into a transmission signal to be transmitted using this SRS-nonassociated use downlink radio resource. This allows the target communication terminal 2 to properly receive a transmission signal transmitted from the base station 1 using an SRS-nonassociated use downlink radio resource.

<Downlink Scheduling Using CQI>

The scheduling executing unit 122 makes downlink scheduling while regarding a downlink communication quality indicated by a CQI announced from the communication terminal 2 and corrected with the first correction value as a downlink communication quality determined when the base station 1 makes downlink communication with this communication terminal 2 using an SRS-associated use downlink radio resource. The scheduling executing unit 122 further makes downlink scheduling while regarding a downlink communication quality indicated by this CQI corrected with the second correction value as a downlink communication quality determined when the base station 1 makes downlink communication with this communication terminal 2 using an SRS-nonassociated use downlink radio resource.

It is assumed for example that a transmission frequency band in which the target communication terminal 2 transmits an SRS in the target unit period 360 is composed of A (A>1) RBs. In this case, for allocation of an SRS-associated use downlink radio resource from the downlink subframe 302 in the target unit period 360 to the target communication terminal 2, the scheduling executing unit 122 adds the first correction value obtained for the target communication terminal 2 to each of A CQIs from the target communication terminal 2 corresponding to each of the A RBs. Then, the scheduling executing unit 122 specifies a CQI of a certain value or more out of the A CQIs corrected with the first correction value. The specified CQI is assumed to include B CQI (B≤A). The scheduling executing unit 122 allocates an SRS-associated use downlink radio resource to the target communication terminal 2 such that the SRS-associated use downlink radio resource contains only the B RB out of the A RBs in the frequency direction corresponding to the B CQI of the certain value or more, specifically such that the SRS-associated use downlink radio resource contains only the frequency band achieving a good downlink communication quality in the frequency direction that is part of a transmission frequency band in which the target communication terminal 2 transmits an SRS.

It is assumed for example that the SRS transmission disabling band 460 is composed of C (C>1) RBs and that the scheduling executing unit 122 allocates to the target communication terminal 2 an SRS-nonassociated use downlink radio resource containing at least part of the SRS transmission disabling band 460 in the frequency direction. In this case, the scheduling executing unit 122 adds the second correction value obtained for the target communication terminal 2 to each of C CQIs from the target communication terminal 2 corresponding to each of the C RBs forming the SRS transmission disabling band. Then, the scheduling executing unit 122 specifies a CQI of a certain value or more out of the C CQIs corrected with the second correction value. The specified CQI is assumed to include D CQI (D≤C). The scheduling executing unit 122 allocates an SRS-nonassociated use downlink radio resource to the target communication terminal 2 such that the SRS-nonassociated use downlink radio resource contains only the D RB out of the C RBs in the frequency direction corresponding to the D CQI of the certain value or more, specifically such that the SRS-nonassociated use downlink radio resource contains only the frequency band achieving a good downlink communication quality in the frequency direction that is part of the SRS transmission disabling band 460.

In this way, this embodiment obtains a correction value used to correct a CQI including the first correction value obtained based on an SRS-associated ACK/NACK signal and the second correction value obtained based on an SRS-nonassociated ACK/NACK signal.

As described above, a downlink communication quality determined when the base station 1 makes downlink communication using an SRS-associated use downlink radio resource differs from a downlink communication quality determined when the base station 1 makes downlink communication using an SRS-nonassociated use downlink radio resource. Thus, a highly accurate CQI can be obtained by correcting a CQI with the first correction value obtained based on an SRS-associated ACK/NACK signal being an ACK/NACK signal responsive to a transmission signal transmitted from the base station 1 using an SRS-associated use downlink radio resource and by correcting a CQI with the second correction value obtained based on an SRS-nonassociated ACK/NACK signal being an ACK/NACK signal responsive to a transmission signal transmitted from the base station 1 using an SRS-nonassociated use downlink radio resource. Specifically, the accuracy of a downlink communication quality obtained at the base station 1 can be enhanced.

In contrast, unlike in this embodiment, it is assumed that there is no distinction between an SRS-associated ACK/NACK signal and an SRS-nonassociated ACK/NACK signal and one type of correction value used to correct a CQI is obtained based on an ACK/NACK signal announced from the target communication terminal 2. In comparison to FIG. 15 described above, it is assumed that if the number of receipts Y of an NACK signal contained in an ACK/NACK signal exceeds the first threshold TH1 before the number of receipts X of this ACK/NACK signal announced from the target communication terminal 2 exceeds the second threshold TH2, an adjustment value is subtracted from a correction value (one type of correction value) used to correct a CQI. It is also assumed that if the number of receipts X of this ACK/NACK signal exceeds the second threshold TH2 before the number of receipts Y of this NACK signal exceeds the first threshold TH1, the adjustment value is added to a correction value used to correct a CQI.

In this case, while a downlink communication quality determined when the base station 1 makes downlink communication using an SRS-associated use downlink radio resource actually differs from a downlink communication quality determined when the base station 1 makes downlink communication using an SRS-nonassociated use downlink radio resource, a CQI corrected with the correction value is used as one indicating both of these downlink communication qualities. This makes it difficult to obtain a highly accurate CQI. Specifically, it becomes very likely that a downlink communication quality obtained at the base station 1 will not be sufficiently accurate. Process relating to downlink communication including downlink scheduling and determining an MCS cannot be performed properly if a CQI of such a low accuracy is used in this process.

This embodiment obtains a correction value used to correct a CQI including the first correction value obtained based on an SRS-associated ACK/NACK signal and the second correction value obtained based on an SRS-nonassociated ACK/NACK signal, so that a highly accurate CQI can be obtained. Process relating to downlink communication can be performed properly by using such a highly accurate CQI in this process. This enhances the performance of downlink communication of the base station 1. As an example, making downlink scheduling while using a highly accurate CQI allows enhancement of a downlink communication quality. As another example, determining an MCS for downlink communication while using a highly accurate CQI allows increase of a throughput of downlink communication.

In the aforementioned example, process relating to downlink communication is performed based on a CQI announced from the communication terminal 2. Meanwhile, a CQI announced from the communication terminal 2 may be converted to an SINR and process relating to downlink communication including downlink scheduling and determining an MCS may be performed based on this SINR. In this case, like in the case of calculating a correction value used to correct a CQI, the correction value calculating unit 126 calculates a correction value used to correct an SINR. A CQI and an SINR are each a downlink quality value indicating a downlink communication quality.

An SINR is expressed in units of decibels. Accordingly, the aforementioned first and second adjustment values and the like are different between the case where they are used to obtain a correction value used to correct a CQI and the case where they are used to obtain a correction value used to correct an SINR.

The present invention is applied to LTE in the aforementioned example. Meanwhile, the present invention is also applicable to a different radio communication system.

While the invention has been shown and described in detail, the foregoing description is in all aspects illustrative and not restrictive. It is therefore understood that numerous modifications not shown can be devised without departing from the scope of the invention.

REFERENCE SIGNS LIST 1, 1a, 1b: Base station
2: Communication terminal
13: Communication unit
110a: Antenna
122: Scheduling executing unit
125: MCS determining unit
126: Correction value calculating unit

The invention claimed is:

1. A base station, comprising:
a communication unit that makes communication using a plurality of antennas, the communication unit controlling the transmission directivity of the antennas based on a known signal transmitted from a communication terminal, when performing downlink communication; and
a correction value calculating unit that obtains a correction value used to correct a downlink quality value indicating a downlink communication quality which said communication terminal obtains based on a signal transmitted from said communication unit,
wherein
a downlink radio resource and an uplink radio resource to be used for transmission of said known signal from said communication terminal are associated for null steering to be performed based on said known signal,
said correction value calculating unit calculates a first correction value used to correct said downlink quality value obtained by said communication terminal, the first correction value being calculated based on a response signal indicating whether said communication terminal has properly received a signal which said communication unit transmits to said communication terminal using said associated downlink radio resource associated with said uplink radio resource used by said communication terminal for transmission of said known signal, and
said correction value calculating unit calculates a second correction value used to correct said downlink quality value obtained by said communication terminal, the second correction value being calculated based on a response signal indicating whether said communication terminal has properly received a signal which said communication unit transmits to said communication terminal using a nonassociated downlink radio resource not associated with said uplink radio resource used by said communication terminal for transmission of said known signal.

2. The base station according to claim 1, further comprising a scheduling executing unit that makes downlink scheduling of allocating a use downlink radio resource to said communication terminal, the use downlink radio resource being used by said communication unit for downlink communication with said communication terminal, wherein for said downlink scheduling, said scheduling executing unit uses a downlink communication quality indicated by said downlink quality value corrected with said first correction value as a downlink communication quality at performing downlink communication using said associated downlink radio resource, said scheduling executing unit using a downlink communication quality indicated by said downlink quality value corrected with said second correction value as a downlink communication quality at performing downlink communication using said nonassociated downlink radio resource.

3. The base station according to claim 1, further comprising an MCS determining unit that determines an MCS (modulation and coding scheme) to be applied to a transmission signal to be transmitted from said communication unit,
wherein
said MCS determining unit determines, based on said downlink quality value corrected with said first correction value, an MCS to be applied to a transmission signal to be transmitted using said associated downlink radio resource, and
said MCS determining unit determines, based on said downlink quality value corrected with said second correction value, an MCS to be applied to a transmission signal to be transmitted using said nonassociated downlink radio resource.

4. The base station according to claim 1, wherein
said correction value calculating unit updates said first correction value by adding a first adjustment value to or subtracting the first adjustment value from said first correction value,
said correction value calculating unit updates said second correction value by adding a second adjustment value to or subtracting the second adjustment value from said second correction value, and
said second adjustment value is set to be smaller than said first adjustment value.

5. A method of calculating a correction value used to correct a downlink quality value indicating a downlink communication quality, the method being implemented in a base station that makes communication using a plurality of antennas, the base station controlling the transmission directivity of the antennas based on a known signal transmitted from said communication terminal, when performing downlink communication, in said base station, a downlink radio resource and an uplink radio resource to be used for transmission of said known signal from a communication terminal being associated for null steering to be performed based on said known signal, the method comprising:
(a) a step of calculating a first correction value used to correct said downlink quality value indicating a downlink communication quality which said communication terminal obtains based on a signal transmitted from said base station, the first correction value being calculated based on a response signal indicating whether said communication terminal has properly received a signal which said base station transmits to said communication terminal using said associated downlink radio resource associated with said uplink radio resource used by said communication terminal for transmission of said known signal; and
(b) a step of calculating a second correction value used to correct said downlink quality value obtained by said communication terminal, the second correction value being calculated based on a response signal indicating whether said communication terminal has properly received a signal which said base station transmits to said communication terminal using a nonassociated downlink radio resource not associated with said uplink radio resource used by said communication terminal for transmission of said known signal.

* * * * *